United States Patent [19]
Morita

[11] Patent Number: 5,828,536
[45] Date of Patent: Oct. 27, 1998

[54] MAGNETIC DISK AND MAGNETIC DISK DEVICE IN WHICH CONTROL DATA SECTION OF DISK HAS STRUCTURAL RELATIONSHIP TO SLIDER AND/OR DATA SECTION

[75] Inventor: Osamu Morita, Miyagi, Japan

[73] Assignee: Sony Corporation, Tokyo, Japan

[21] Appl. No.: 786,912

[22] Filed: Jan. 22, 1997

[30] Foreign Application Priority Data

| Jan. 24, 1996 | [JP] | Japan | 8-029850 |
| Jan. 24, 1996 | [JP] | Japan | 8-029851 |
| Jan. 24, 1996 | [JP] | Japan | 8-029852 |
| Jan. 24, 1996 | [JP] | Japan | 8-029853 |
| Jan. 24, 1996 | [JP] | Japan | 8-029854 |
| Jan. 25, 1996 | [JP] | Japan | 8-032675 |

[51] Int. Cl.$^6$ ............................................. G11B 5/82
[52] U.S. Cl. ............................................. 360/135
[58] Field of Search ................................. 360/135, 133

[56] References Cited

U.S. PATENT DOCUMENTS 5,504,646  4/1996  Tanaka ..................................... 360/135
5,590,009  12/1996  Ishida ..................................... 360/135

Primary Examiner—A. J. Heinz
Attorney, Agent, or Firm—Hill & Simpson

[57] ABSTRACT

This invention provides a magnetic disk and a magnetic disk device having the magnetic disk, which is capable of suppressing the floating variation of the head slider on the magnetic disk. The magnetic disk, in which the circumferential length of the control signal recording zone has a value not exceeding the length 3/10 times that of the head slider, in which the ratio of the depth of groove on the data recording zone and the depth of groove on the control signal recording zone is 0.2 or larger and 4.7 or smaller, in which the train of the control signal recording zones are entirely or partially provided on each projected length of the head slider, which is structured so that the step difference of the land groove does not exceed 320 nm, which is provided with the land for recording data and the groove for rendering dynamic pressure to the head slider for floating just above the groove, or in which the load capacity of the head slider on the data recording zone is equal to the load capacity of the head slider on the control signal recording zone.

20 Claims, 20 Drawing Sheets

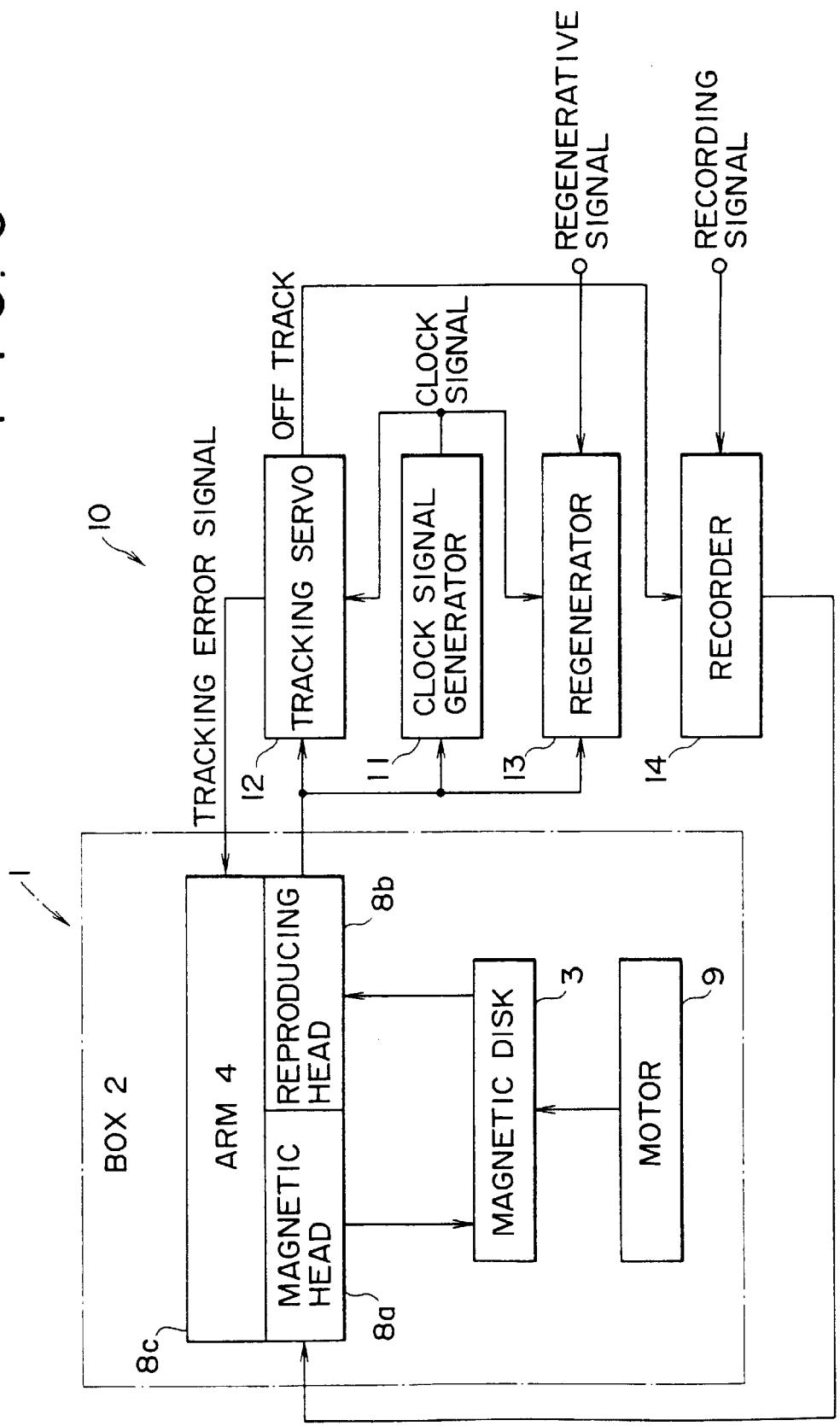

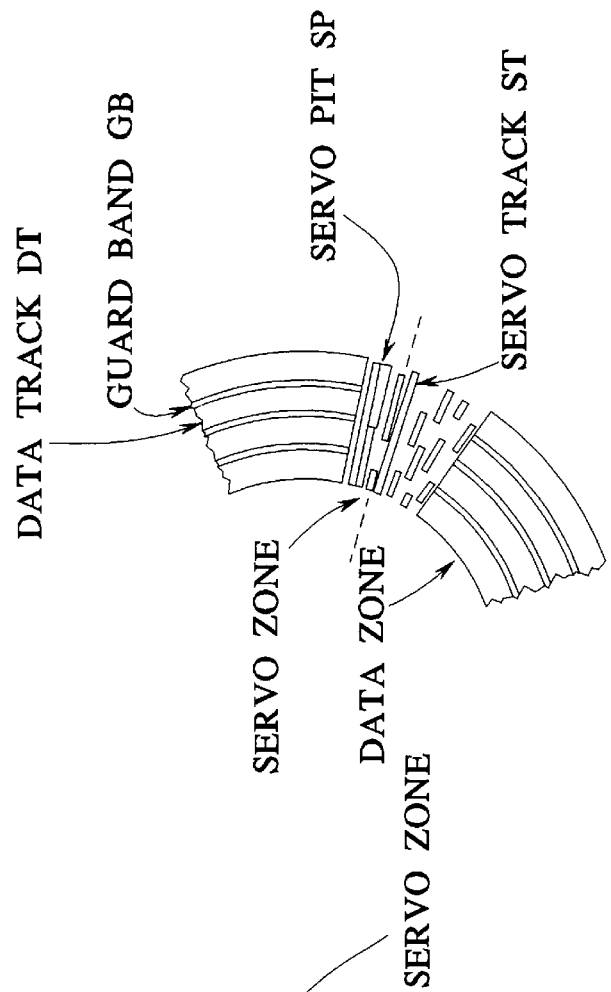
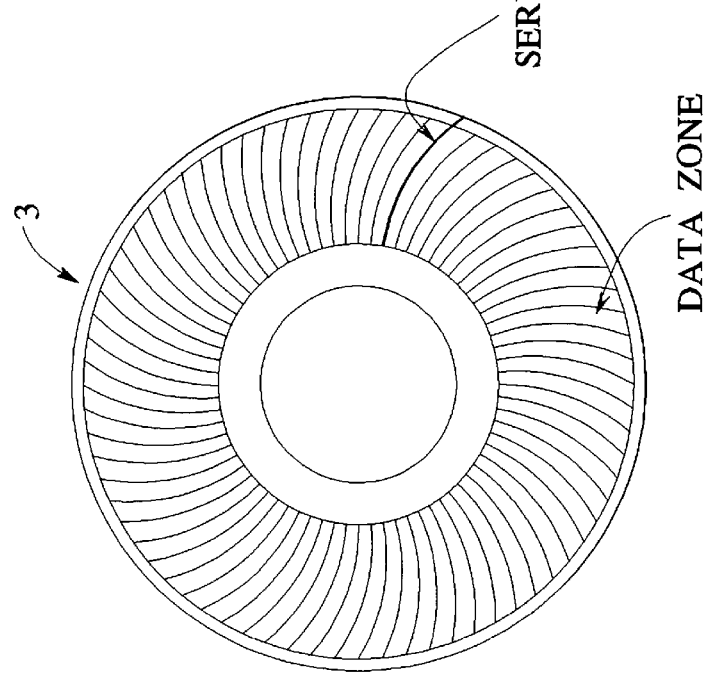

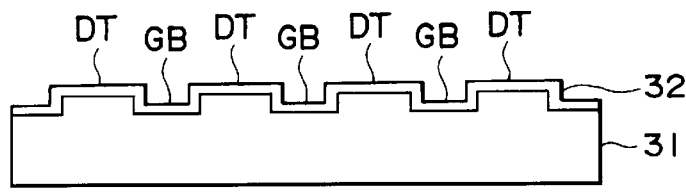
FIG. 7A
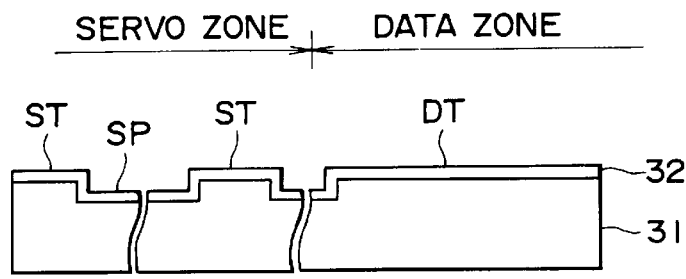
FIG. 7B
FIG. 8
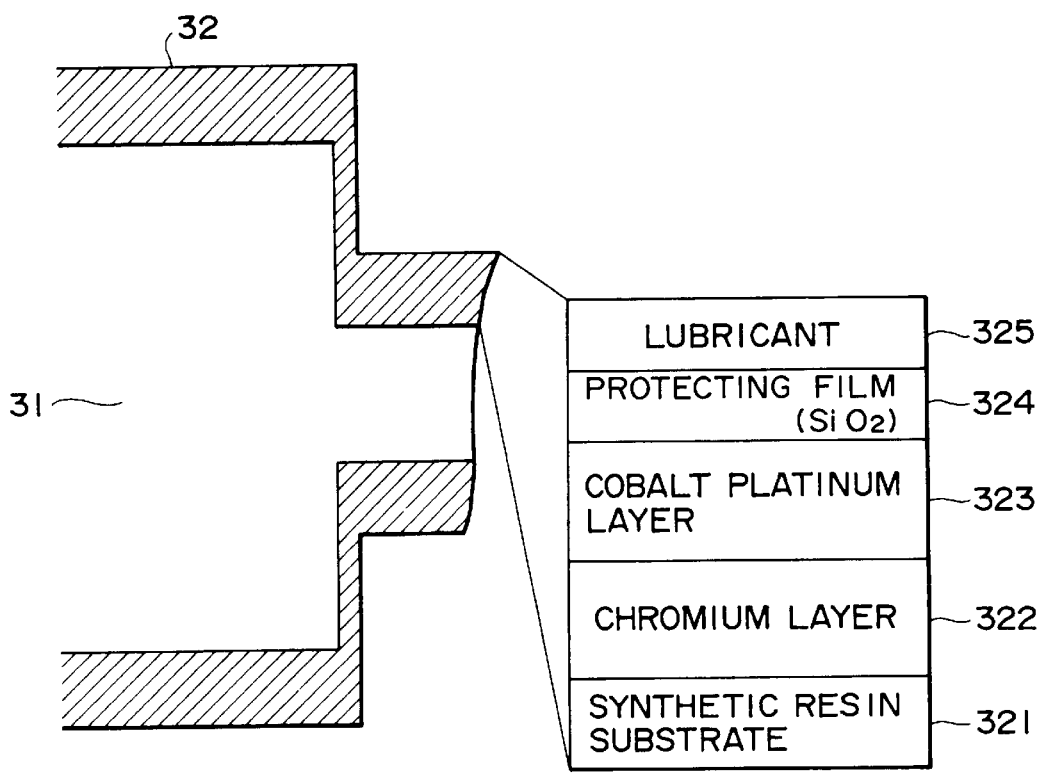

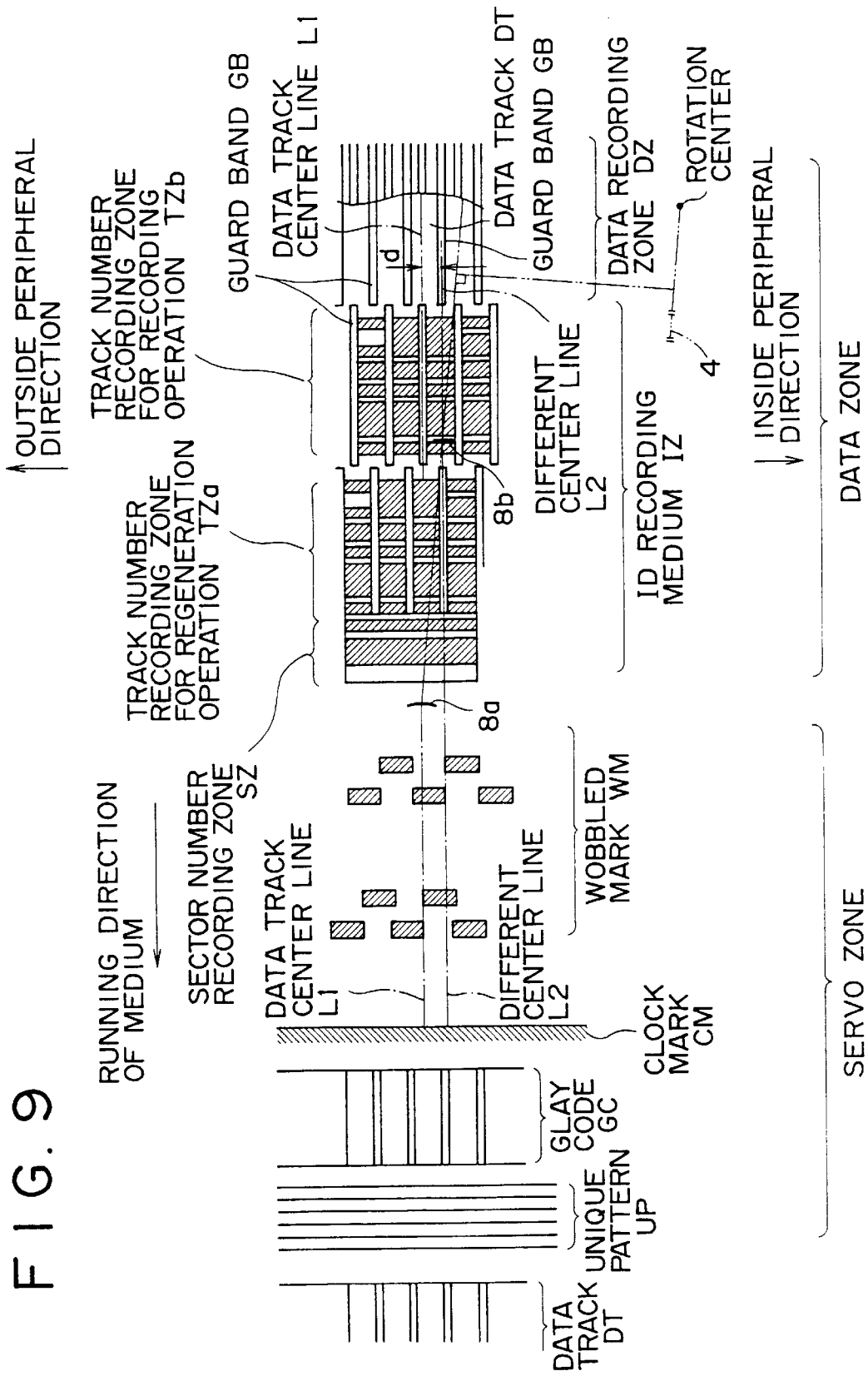

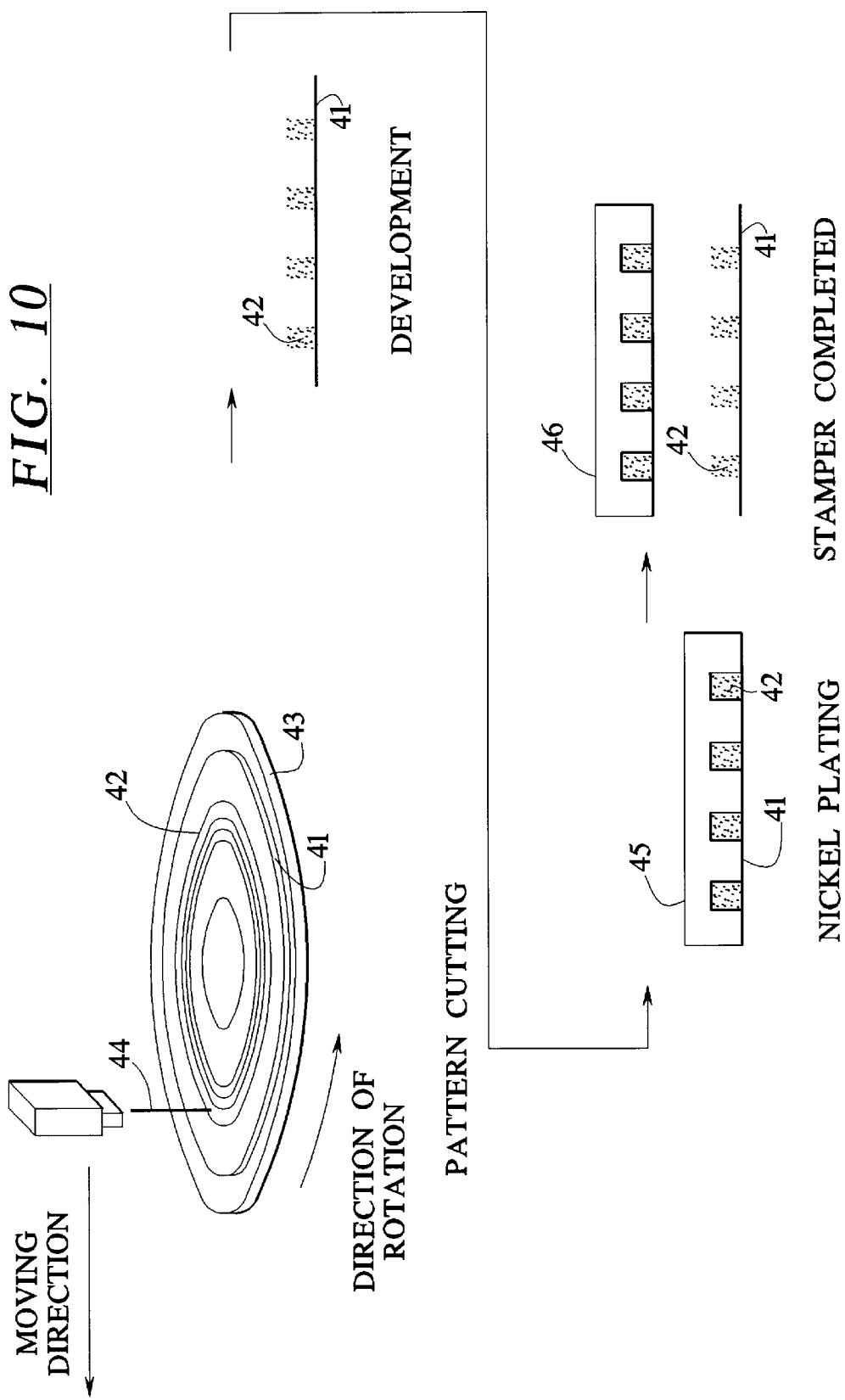

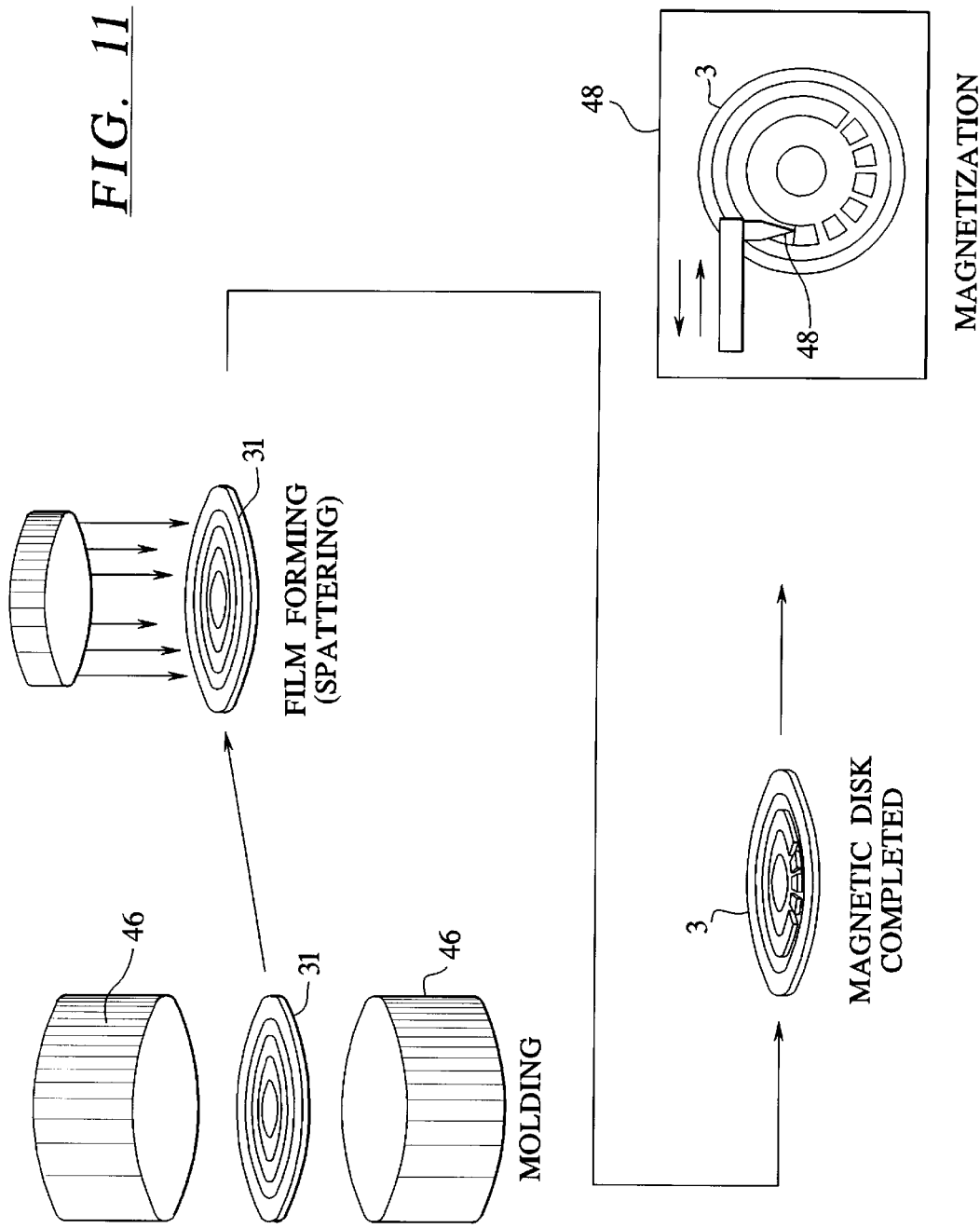

F I G. 15
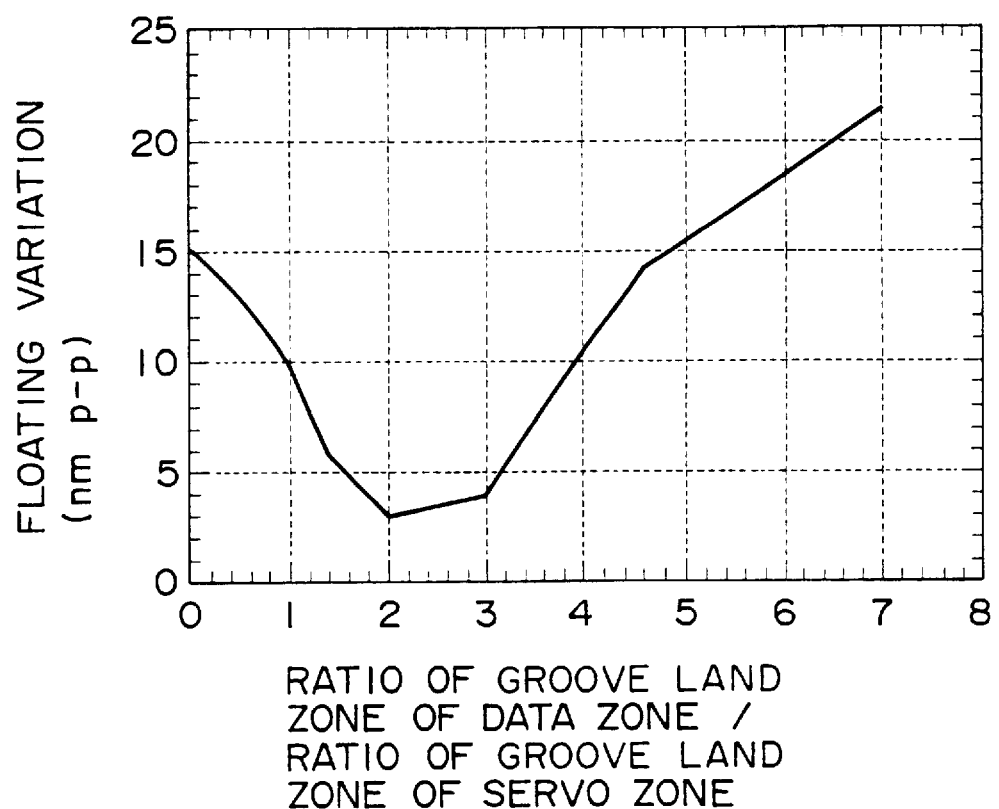

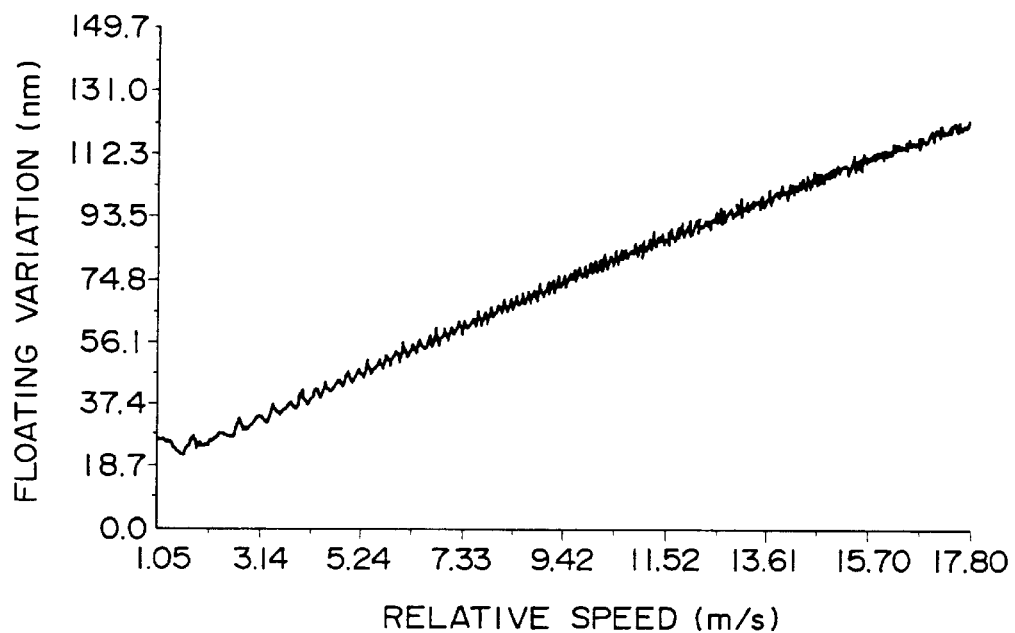
F I G. 24A
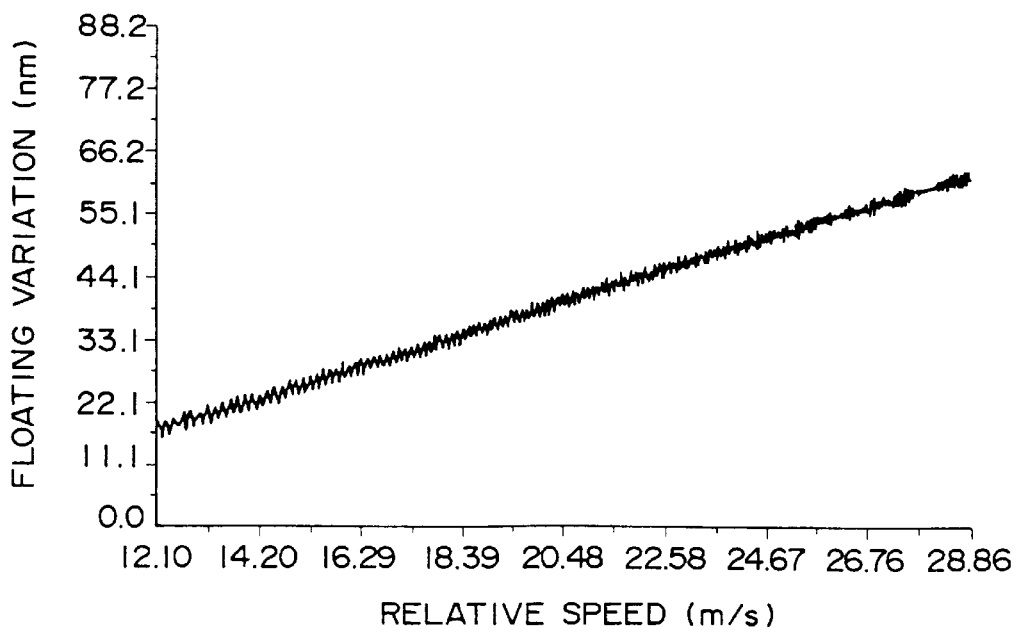
F I G. 24B h0: ARBITRARY FLOATATION
δ: DEPTH OF GROOVE

MAGNETIC DISK AND MAGNETIC DISK DEVICE IN WHICH CONTROL DATA SECTION OF DISK HAS STRUCTURAL RELATIONSHIP TO SLIDER AND/OR DATA SECTION

BACKGROUND OF THE INVENTION

1. Field of the Invention

This invention relates to a magnetic disk for recording and regenerating data and programs using a magnetic head mounted on a floating type head slider and magnetic disk device provided with the magnetic disk.

2. Description of Related Art

For example, a hard disk device is used as a magnetic disk device in a computer system. On the both sides of a magnetic disk incorporated in a hard disk device, magnetic films are formed, and a magnetic head mounted on a head slider which is floating on the surface of the magnetic disk records data in tracks on the magnetic film, and regenerates data recorded in tracks on the magnetic film. Because the mechanism for driving the floating head slider on which the magnetic head is mounted and the driver for driving the magnetic disk are incorporated in the internal of a box, it is possible to record data in relatively high density and to take quick access to data recorded.

However in the conventional technique, a magnetic film is formed over the entire surface of both sides of magnetic disk incorporated in a hard disk device. To prevent crosstalk from an adjacent track, a relatively wide guard band is required between a data track and the adjacent data track. As the result, the track pitch is not allowed to be narrow, and it is difficult to realize a hard disk device with minimized size having a large recording capacity, this is a problem.

Further, for assembling a hard disk drive, after a magnetic disk is incorporated in a box, a clock signal for arranging track pattern, servo signal for tracking, signal for identifying recording data are successively recorded in all tracks. These operations result in long assembling time and high cost of a hard disk device, this is another problem.

To solve these problems of magnetic disk devices, the applicant of the present invention proposed a hard disk device as described hereinafter (refer to Japanese Patent Laid-Open No. Hei 6-259709). On a magnetic disk incorporated in the hard disk device, the data recording zone (referred to as data zone hereinafter) comprising land and groove and control signal recording zone (referred to as servo zone hereinafter) are formed radially. In detail, circular data tracks and guard bands are provided concentrically on the data zone which is formed so that a land serves as a data track for recording data and a groove serves as a guard band for defining the boundary between adjacent data track. On the serve zone, a land is formed so that gray codes for specifying a data track, clock mark for dividing one circle in equal space, and webbed mark (referred to as servo track hereinafter) are recorded on the land, and a groove is formed so as to serve for defining the above-mentioned codes (referred to as servo pit hereinafter).

At least any one of gray code, clock mark, and wobbled mark is formed along the rotational locus of a magnetic head, operations such as recording and regeneration of data by a magnetic head is controlled in response to the signal obtained by regenerating the gray code, clock mark, or wobbled mark.

The magnetic head measures the variation corresponding to an eccentric distance of the magnetic disk based on a signal obtained by regenerating the gray code, clock mark, or wobbled mark, and the operation such as recording and regeneration of data by the magnetic head is controlled dependently on the result of the measurement.

According to the hard disk device incorporated with the magnetic disk having such structure, because the guard band is formed as a physical groove to the data track, data are seldom regenerated from the guard band. It is therefore not necessary to use the guard band with wide width, and the track pitch is allowed to be narrow in order to increase the recording capacity.

Further, the forming of the gray code, clock mark, or wobbled mark in a configuration of the land along the rotational locus of the magnetic head allows such codes to be provided at the accurate position utilizing, for example, optical processing technique, thus it becomes possible to correctly record and regenerate data with narrow track pitch.

The floating space should be minimized as small as possible, for example, the floatation space of 50 nm is required to suppress the spacing loss of the floating head slider used for such high density recording magnetic disk. In addition, the floating variation should be minimized to suppress the output variation.

The servo zone and data zone are different in repeating pattern each other and in the ratio of land and groove. The height of a pit is the same as or higher than that of a texture, and the size of a pit is about several $\mu$m and the same as that of a texture. The difference between the pattern configuration of a servo zone and the pattern configuration of a data zone results in the difference in the floating space between the servo zone and data zone. The floating space difference causes the floating space variation, and the variation degrades the stability of data recording and regeneration of data by the magnetic head.

In view of the above-mentioned problems, it is the object of the present invention to provide a magnetic disk and magnetic disk device provided with the magnetic disk, which magnetic disk allows a head slider to be operated within a suppressed floating variation on the surface of the magnetic disk.

SUMMARY OF THE INVENTION

In a magnetic disk provided with a magnetic head mounted on a floating head slider for recording and regeneration of data the surface zone of which magnetic disk is radially divided to the data recording zone and control signal recording zone by lands and grooves formed on the surface, the object of the present invention is achieved by the magnetic disk in which the circumferential length of the control signal recording zone has a length not exceeding the length 3/10 times that of the head slider. According to the above-mentioned structure, the length of the control signal recording zone in the circumferential direction which directly relates to the floatation of the head slider is prescribed to a desired value, the variation of the floatation can be suppressed when the head slider travels from the data zone to servo zone or the servo zone to data zone.

The object of the present invention is achieved by the magnetic disk in which the ratio of the depth of groove on the data recording zone and the depth of groove on the control signal recording zone is 0.2 or larger and 4.7 or smaller. According to the above-mentioned structure, because the depth of groove on the data recording zone and control signal recording zone which directly relates to the floatation of the head slider is prescribed to a desired ratio, the variation of the floatation can be suppressed when the head slider travels from the data zone to servo zone or the servo zone to data zone.

The object of the present invention is achieved by the magnetic disk in which the train of the control signal recording zones are entirely or partially provided on each projected length of the head slider. According to the above-mentioned structure, because the control signal recording zone which directly relates to the floatation of the head slider is provided based on the projection length of the head slider, the variation of the floatation can be suppressed when the head slider travels from the data zone to servo zone or the servo zone to data zone.

The object of the present invention is achieved by the magnetic disk which is structured so that the step difference of the land groove does not exceed 320 nm. According to the above-mentioned structure, because the step difference of the groove land which directly relates to the floatation of the head slider is prescribed to a desired value, the variation of the floatation can be suppressed when the head slider travels from the data zone to servo zone or the servo zone to data zone.

The object of the present invention is achieved by the magnetic disk provided with the land for recording data and the groove for rendering dynamic pressure to the head slider for floating just above the groove. According to the above-mentioned structure, because the spring constant of the air film generated between the head slider and magnetic disk can be small, the head slider can float stably though the floatation of the head slider on the surface of the magnetic disk is small.

The object of the present invention is achieved by the magnetic disk in which the load capacity of the head slider is equal in the data recording zone and control signal recording zone. According to the above-mentioned structure, because the load capacity which directly relates to the floatation of the head slider is even over the entire surface of the magnetic disk, the variation of the floatation can be suppressed when the head slider travels from the data zone to servo zone or the servo zone to data zone.

BRIEF DESCRIPTION OF THE DRAWINGS

FIG. 5 is a block diagram for illustrating a structural example of the controller of the hard disk device shown in FIG. 1.

FIG. 6 is a plan view for illustrating an embodiment of the magnetic disk of the present invention.

FIGS. 7A and 7B are cross-sectional structural views in the radial direction and cross-sectional structural view in the circumferential direction of the magnetic disk shown in FIG. 6.

FIG. 8 is a cross-sectional structural view for illustrating the detail of the magnetic disk shown in FIG. 6.

FIG. 9 is a plan view for illustrating details of the surface of the magnetic disk shown in FIG. 6.

FIG. 10 is the first diagram for illustrating the manufacturing process of the magnetic disk shown in FIG. 6.

FIG. 11 is the second diagram for illustrating the manufacturing process of the magnetic disk shown in FIG. 6.

FIG. 15 is a graph for describing the relationship between the floating variation of the head slider of the herd disk device shown in FIG. 1 and the quotient of the ratio of the data track DT and guard band GB on the data zone divided by the ratio of the servo track ST and servo pit SP on the serve zone.

FIGS. 24A and 24B are graphs for describing the relationship between the floatation of the head slider on the flat surface and groove land surface and the relative speed between the glass disk and head slider.

DETAILED DESCRIPTION OF PREFERRED EMBODIMENTS

Preferred embodiments of the present invention will be described in detail hereinafter referring to the attached drawings.

Because the embodiments described hereinafter are preferred detailed examples of the present invention, the embodiments involve various preferred limitations, however, the scope of the invention is by no means limited to these embodiments, unless otherwise described to limit the invention in the description hereinafter.

Figure 1:
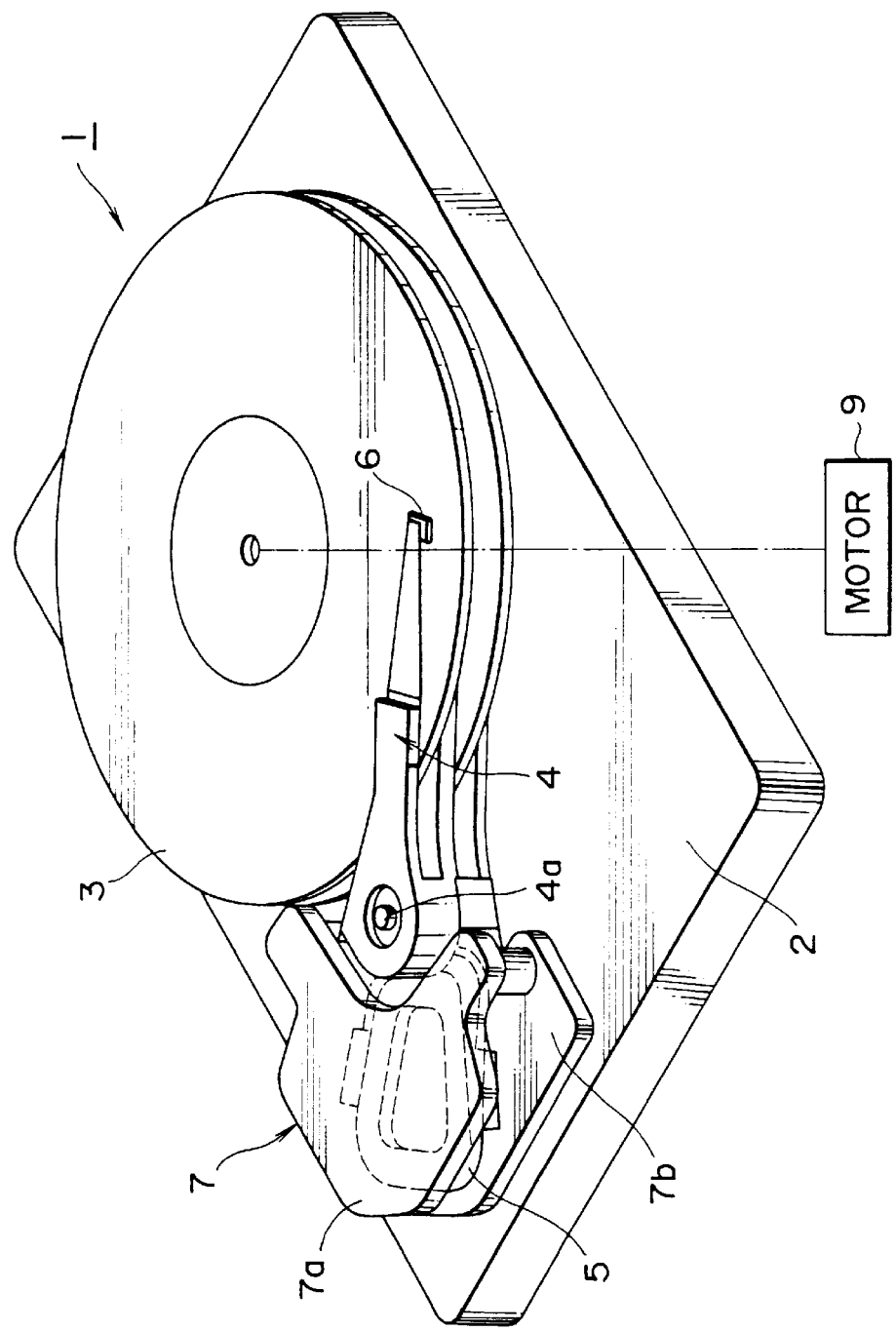
FIG. 1 is a perspective view for illustrating the structural example of a hard disk device in accordance with an embodiment of the magnetic disk device of the present invention.
Figure 2:
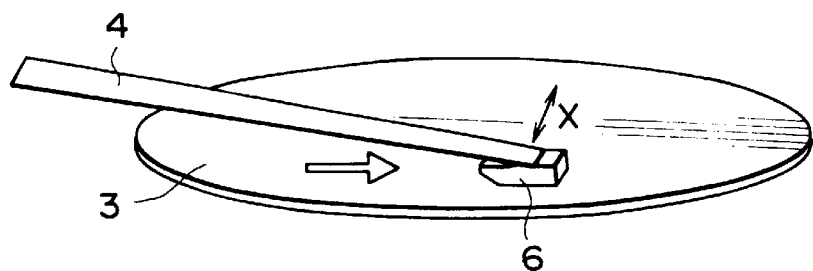
FIG. 2 is a perspective view for illustrating the operational example of a head slider of the hard disk drive shown in FIG. 1.

FIG. 1 is a perspective view for illustrating the structure of a hard disk device that is a magnetic disk device in accordance with the first embodiment of the present invention.

In the hard disk device 1, a spindle motor 9 is provided on the back side of a flat member of a box 2 formed of aluminum alloy, and a magnetic disk 3 which is rotatively driven at a constant angular velocity by the spindle motor 9 is provided. Further, an arm 4 is mounted swingably around the vertical shaft 4a to the box 2. A voice coil 5 is fixed to one end of the arm 4, a head slider 6 is fixed to the other end of the arm 4. On the box 2, magnets 7a and 7b are fixed with interposition of the voice coil 5. The voice coil 5, and magnets 7a and 7b constitute the voice coil motor 7.

Figure 3:
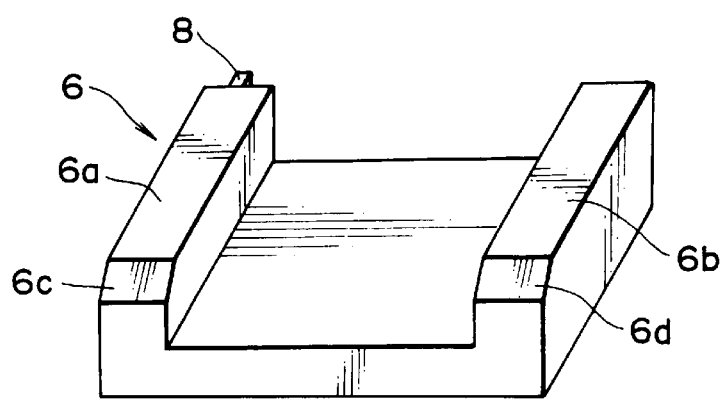
FIG. 3 is a perspective view for illustrating a detailed example of the head slider of the hard disk device shown in FIG. 1.

In such structure, upon starting of supply of a current to the voice coil from the outside, a force generated by the magnetic field of the magnets 7a and 7b and the current through the voice coil 5 activates the arm 5 to rotate around the vertical axis 4a. With the rotation of the arm 5, the head slider 6 fixed to the other end of the arm 4 moves essentially in the radial direction as shown by the arrow X. Therefore, the magnetic head 8 (refer to FIG. 3) mounted on the head slider 6 performs the seek operation on the magnetic disk 3, and performs recording and regenerating operation of data on the desired data track on the magnetic disk 3.

Figure 4:
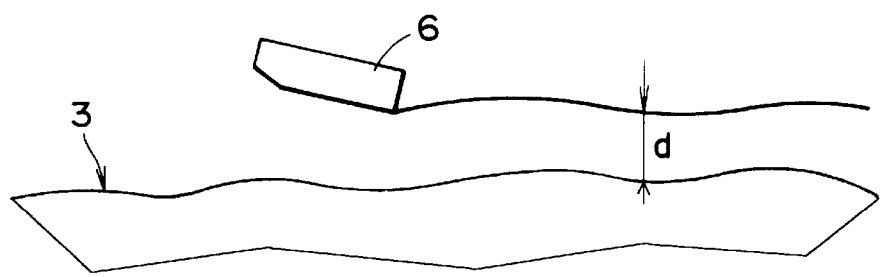
FIG. 4 is a side view for illustrating the head slider of the head disk device shown in FIG. 1.

On both sides of the bottom of the head slider 6, rails 6a and 6b are formed for serving as air bearing surface, and tapers 6c and 6d are formed on the air inflow ends of the rails 6a and 6b. Thus, when the head slider 6 comes near the surface of the rotating magnetic disk 3, the head slider 6 receives a floating force generated by the air inflow flowing between the surface of the rails 6a and 6b and the magnetic disk 3 resulting from the rotation of the magnetic disk 3. The head slider 6 and magnetic head 8 are floated for running with a small space (floating distance) d from the surface of the magnetic disk 3 as shown in FIG. 4.

FIG. 5 is a block diagram for illustrating a structural example of the controller of the hard disk device shown in FIG. 1.

The clock signal generator 11 of the controller 10 generates a clock signal based on the signal regenerated by the reproducing head 8b of the magnetic head 8 and transmits it to a tracking servo 12 and regenerator 13. The tracking servo 12 generates a tracking error signal based on the signal from the reproducing head 8b referring to the clock signal from the clock signal generator 11, and drives the arm 4 in response to it. Thus, the recording head 8a and reproducing head 8b are tracking-controlled at the desired radial position on the magnetic disk 3. A recorder 14 modulates a recording signal provided from a circuit not shown in the figure, and the recording signal is recorded in the magnetic disk 3 through the recording head 8a. The regenerator 13 demodulates the recording signal from the reproducing head 8b and provides it to the above-mentioned circuit. The tracking servo 12 monitors a tracking error signal and, if the recording head 8a jumps off from a data track, for example, when the magnetic disk device receives a shock, the tracking servo 12 controls the recorder 14 to stop recording.

FIG. 6 is a plan view for illustrating an embodiment of the magnetic disk of the present invention. FIG. 7A is a cross-sectional structural diagram in the radial direction. FIG. 7B is a cross-sectional structural diagram in the circumferential direction.

On a substrate 31 of the magnetic disk 3 consisting of synthetic resin, glass, or aluminum, data recording zones (data zone) and control signal recording zones (servo zone) comprising lands and grooves are formed radially, and a magnetic film is formed on the surface. In detail, on a data zone, concentrically circular data tracks DT for recording data are formed in land form, and guard bands GB for defining boundaries between data tracks are formed in groove form. On a servo zone, servo tracks such as gray codes for specifying the data track, clock marks for dividing one circle in equal space, and webbed mark for tracking-controlling the magnetic head are formed in land form, and servo pits SP that are space for defining the above-mentioned codes are formed in groove form.

According to such magnetic disk 3, the structure that the servo zones and data zones are formed along the travel locus of the magnetic head 8 toward in the inside peripheral direction or outside peripheral direction ensures the equal time interval in seek operation, and is helpful for suppressing the lockout of PLL circuit for generating clock. In addition, the azimuth loss is suppressed.

FIG. 8 is a cross-sectional view for illustrating the detail of the magnetic disk shown in FIG. 6. A step difference of, for example, 200 nm is formed on both sides of a substrate 31, if the substrate consists of glass, the thickness is prescribed to be 0.65 mm, and if the substrate consists of synthetic resin, the thickness is prescribed to be 1.2 mm. In addition, a magnetic film 32 is formed on both sides of the substrate 31.

Thermoplastic norbornane resin is preferably used as the synthetic resin used for molding synthetic resin substrates because of high heat resistance and low moisture deformation, alternatively polycarbonate resin may be used.

On a synthetic resin substrate 321, a chromium layer with a thickness of about 80 nm is formed. The chromium layer 322 functions as an exchanging bonding film, and is effective for improvement of the magnetic property, particularly for enhancing coercive force. On the chromium layer 322, a cobalt platinum layer 323 with a thickness of about 40 nm is formed. On the cobalt platinum layer 323, a protecting layer 324 consisting of $SiO_2$ with a thickness of about 10 nm is formed by spin coating or coating. On the protecting layer 324, a lubricant agent is coated.

One circle of such magnetic disk 3 is divided into 60 sectors, and each sector is divided into 14 segments. Accordingly, one circle includes 840 segments. Each segment is categorized into the servo zone or data zone. On a servo zone, a gray code GC, clock mark CM, and wobbled mark WM are formed as shown in FIG. 9. On the head segment of each sector, a unique pattern UP is added additionally. On one sector out of 60 sectors, a home index which functions as PG is recorded instead of a unique pattern UP.

Assuming the width in the track direction of a clock mark CM to be 1, the width of a gray code GC is 20 and the width of a unique pattern UP is 16.

The gray code GC is a code for representing a absolute address (data track number) for specifying a data track DT.

The clock mark CM is a mark for generating the clock used as the reference for recording and regeneration, the reproducing head 8b generates a timing signal corresponding to an edge when the reproducing head 8b regenerates a clock mark CM. The clock mark CM is radially formed continuously in the radial direction of the magnetic disk 3 as shown in FIG. 9.

Wobbled marks WM are provided on the inside peripheral side and outside peripheral side with deviation with respect to the center line L1 of a data track DT, and provided apart each other in the track direction with some spacing. When the reproducing head 8b regenerates a wobbled mark WM, the reproducing head 8b generates a position pulse corresponding to the edge. By operating the tracking servo so that the level of the position pulses are made equal, the reproducing head 8b is positioned on the center line L1 of the data track DT.

At the head of a data zone, ID recording zone IZ is formed, data to be recorded or regenerated by nature is recorded in the data recording zone DZ subsequent to the ID recording zone IZ. ID recording zone IZ is categorized to the sector number recording zone SZ and track number recording zone TZ. At least the sector number recording zone SZ is formed radially and continuously in the radial direction of the magnetic disk 3 in the same manner as the clock mark CM. In the sector number recording zone SZ, a sector number of 8 bits for specifying a sector is recorded, and in the track number recording zone TZ, two track numbers of 16 bits for each number for specifying the data track are recorded. An ID data of 40 bits is PR(partial response)(−1, 0, 1)-modulated and recorded in the ID recording zone IZ. The reproducing head 8b regenerates the ID data recorded in the ID recording zone IZ to generates a pulse train.

The track number recording zone TZ is categorized to the track number recording zone for regeneration operation TZa and track number recording zone for recording operation TZb. The track number recording zone for regeneration operation TZa is formed so that the center line in the width direction coincides with the center line L1 of the data track DT, but the track number recording zone for recording operation TZb is formed so that the center line L2 in the width direction is located apart from the center line L1 of the data track DT with a deviation d in the perpendicular direction to the data track DT (radial direction of the magnetic disk 3). The distance d is smaller as the position is nearer to the inside periphery and larger as the position is nearer to the outside periphery. The same track number is recorded in the track number recording zone for regeneration operation TZa and track number recording zone for recording operation TZb.

A wobbled mark WM for positioning the reproducing head 8b with respect to the center line L1 of the data track DT, and another wobbled mark WM for positioning the reproducing head 8b to trace the center line L2 of the track number recording zone for recording operation TZb are formed in the servo zone.

Accordingly, in the regeneration mode, by tracking-controlling the reproducing head referring to the wobbled mark WM, the reproducing head 8b can scan along the center line L1 of the data track DT. On the other hand, in the recording mode, by tracking-controlling in response to a tracking error signal resulting from regeneration of the wobbled mark WM using the reproducing head 8b, the reproducing head 8b can scan along the center line L2 of the track number recording zone for recording operation TZb. When, the recording head 8a runs along the center line L1 of the data track DT.

The zone for recording the sector number or track number is previously formed and the sector number or track number is recorded therein as described herein above, the regeneration of the sector number or track number is therefore ensured in spite of the reproducing head 8b in positioning mode.

The above-mentioned magnetic disk 3 can be manufactured utilizing optical technique, and the manufacturing process will be described referring to FIG. 10 and FIG. 11.

First, for example, photo resist 42 is coated on the surface of a glass disk 41. The glass disk 41 on which the photo resist 42 was coated is placed and rotated on a turn table 43, and a laser beam 44 is irradiated only onto, for example, the desired area of the photo resist 42 to be formed in groove for pattern cutting. After the irradiation of the laser beam 44, the photo resist 42 is developed to remove the exposed portion of the photo resist 42. Nickel 45 is plated on the surface of the glass disk 41 from which the exposed portion of the photo resist 42 was removed. The nickel 45 is peeled off from the glass disk 41 and used as a stamper 46.

Next, a substrate 31 is formed using the stamper 46, and then a magnetic film 32 is formed on the surface of the substrate 31 by spattering to produce a magnetic disk 3.

Figure 12A:
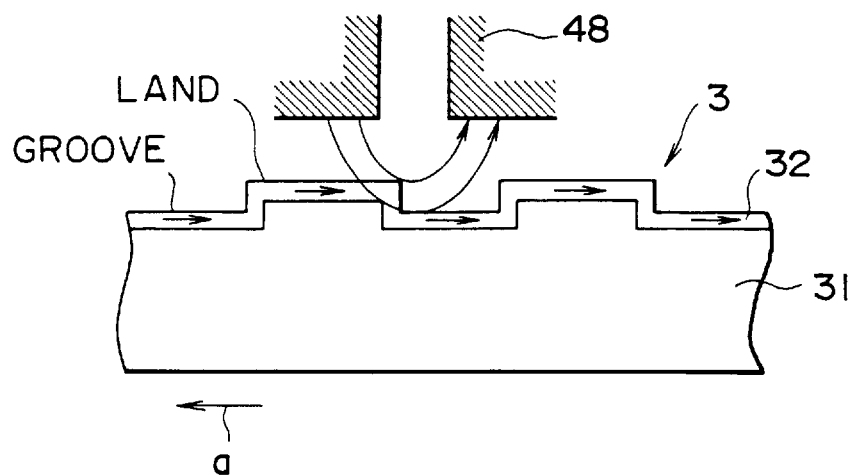
FIGS. 12A and 12B are the third diagrams for illustrating the manufacturing process of the magnetic disk shown in FIG. 6.
Figure 12B:
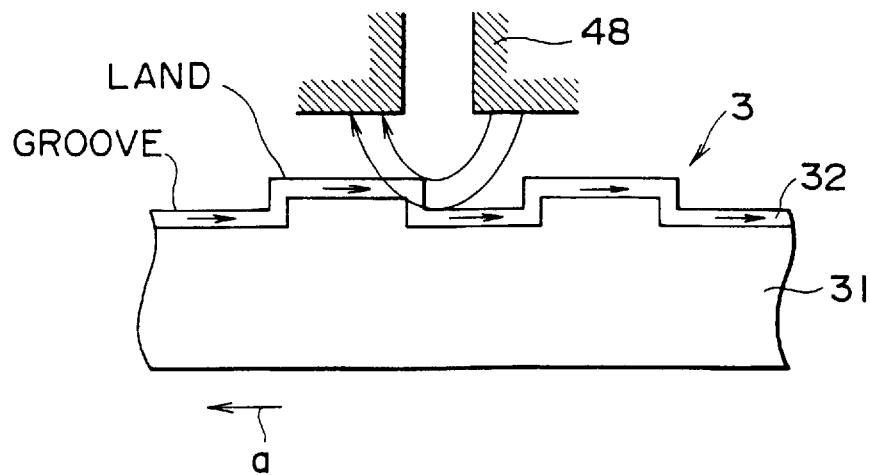

Then, the magnetic disk 3 is magnetized by the way as described herein under. The magnetic disk 3 is set on a magnetizer 48, and rotated in the direction shown by the arrow a in FIG. 12. As shown in FIG. 12A, the magnetization magnetic head 49 is moved with the track pitch in the radial direction of the magnetic disk 3 while the first direct current is being supplied to the magnetization magnetic head 49, the magnetic film 32 including land and groove of the magnetic disk 3 is entirely magnetized temporarily in the same direction. Afterwards, the magnetization magnetic head 49 is moved with the track pitch in the radial direction of the magnetic disk 3 while the second direct current which has reverse polarity of the first direct current and has a current value smaller than the first direct current is being supplied to the magnetization magnetic head 49, only the magnetic film 32 of land of the magnetic disk 3 is thus magnetized reversely, and then the positioning signal (wobbled mark, clock mark) is written.

As described herein above, the work for replacing the magnetization magnetic head 49 can be omitted because the positioning signal is written using only one magnetization magnetic head 49, and the production efficiency of magnetic disks 3 is enhanced.

The floatation variation due to various machine accuracies involved in the work for mounting the head slider 6 to the magnetic disk device 1 should be taken into consideration in the design of floatation of the head slider 6 of the magnetic disk device 1 provided with the magnetic disk 3 having the structure as described herein above.

For example, if the floatation of the head slider 6 is prescribed to be 50 nm, the tolerance of floatation variation of the head slider 6 is generally specified for items shown herein under. In detail, the specified tolerance value is ±10% for variation of work accuracy of the head slider 6, ±20% for variation of weight of the head slider 6, ±10% for variation of Z-height, ±10% for waviness of a substrate 31, ±10% for warpage of a substrate 31, ±10% for seeking, ±10% for atmospheric pressure variation, ±10% for servo zone, −5% for margin, and 35 nm for glide height.

The weight of the head slider 6 among the above-mentioned items is sensitive to the floating variation, the tolerance for the weight is specified larger in comparison other items. However, because the working technique for manufacturing suspensions for loading the weight on the head slider 6 is improved, the tolerance for the floatation variation of the head slider 6 to the variation of weight of the head slider 6 is amended to ±10%. Based on the amendment, the tolerance of floatation variation of the head slider 6 to the servo zone can be amended to ±20%. Accordingly, if the floatation of the head slider 6 is prescribed to be 50 nm, the floatation variation of the head slider 6 to the servo zone may be 20 nm p-p, more desirably 10 nm p-p.

The floatation variation of the head slider 6 increases if the ratio of land and groove zone of the data zone and land and groove zone of the servo zone of the magnetic disk 3 is different. By reducing the area of the servo zone which occupies on the magnetic disk 3 in relative to the area of data zone which occupies on the magnetic disk 3 to the extent that the head slider 6 can not recognize the difference the ratio of the groove and land zone of the data zone and the groove and land zone of the servo zone, the floatation variation of the head slider 6 can be suppressed. Because the magnetic disk 3 is used for recording and regeneration of data, the area of the data zone is usually larger than the area of the servo zone, the method agrees with the well known advantage in quality of the magnetic disk 3 which has smaller servo zone area occupying on the magnetic disk 3 in comparison with the data zone area occupying on the magnetic disk 3.

In order to actually reduce the area of the servo zone occupying on the magnetic disk 3 in comparison with the area of the data zone occupying on the magnetic disk 3, the length of the servo zone in the circumferential direction may be shortened in comparison with the length of the data zone in the circumferential direction of the magnetic disk 3. The length in the circumferential direction is basically longer as the position is nearer the outside periphery of the magnetic disk 3. The length in the circumferential direction of the data zone is about 4 mm at the position for the largest. Accordingly, since the length of the head slider is about 2 mm, the maximum length in the circumferential direction of the data zone is about twice the length of the head slider. On the other hand, the length in the circumferential direction of the servo zone is about 300 μm at the position for the longest. Accordingly, the maximum length in the circumferential direction of the servo zone is about ⅙ times the head slider length. The relationship between the length in the circumferential direction of the data zone and servo zone and the floating variation of the head slider 6 is examined.

The disk for measurement is a glass-made disk, and the same data zone and servo zone as the actual magnetic disk 3 are provided on the measurement disk. The data zone and servo zone are formed on a glass disk in the same manner as used for the actual magnetic disk 3. First, resist is coated on the glass disk surface, the coated resist is exposed using the pattern of the data zone and servo zone based on the cutting data. After the exposing, the resist is developed by RIE (reactive ion etching) to form the pattern of the data zone and servo zone.

The track pitch and track width of the data zone are 4.8 μm and 3.2 μm respectively, the depth of the guard band GB, namely the depth of the groove, is 200 nm.

The servo zone is formed not linearly from the inside periphery to the outside periphery unlike an actual servo zone, but formed in curved configuration along the seek locus of the head slider 6. The depth of the servo pit SP of the servo zone, namely the depth of the groove, is 200 nm, and servo tracks ST and servo pits SP having various length in the circumferential direction shown herein under are formed in the area between the radius of 15.5 mm to 35.0 mm of the glass disk. The servo zone length of the glass disk shown below represents the length at the radius of 35 mm of the glass disk, the servo zone length at the same position of the actual magnetic disk 3 is also shown for reference

| Servo zone length of the glass disk | Servo zone length of the magnetic disk |
| --- | --- |
| 10 μm | 8.6 μm |
| 25 μm | 21.5 μm |
| 50 μm | 43.0 μm |
| 75 μm | 64.5 μm |
| 100 μm | 86.0 μm |
| 135 μm | 116.1 μm |
| 175 μm | 150.5 μm |
| 250 μm | 215.0 μm |

The head slider 6 is a generally used taper flat 50% nano-slider having two rails, the slider length is 2.0 mm, slider width is 1.6 mm, rail width is 200 μm, and the weight is 3.5 gf. When such head slide 6 is located at the radius position of 30.2 mm of the glass disk and the glass disk is rotated at a rotation speed of 4000 rpm, the relative speed between the head slider 6 and glass disk is 12.5 m/s and the floatation of the head slider 6 is about 50 nm.

Figure 13:
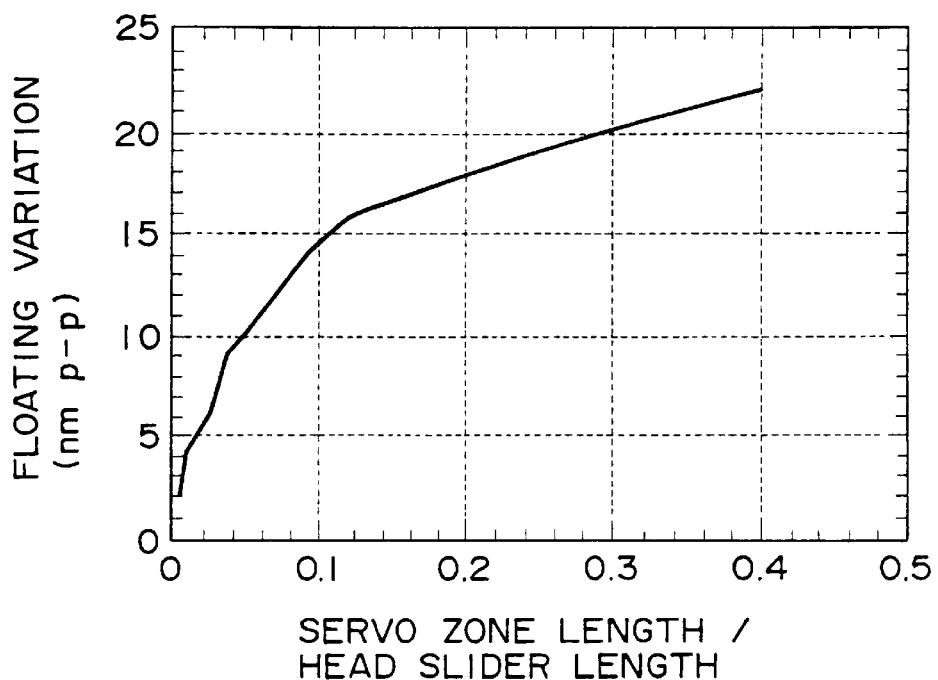
FIG. 13 is a graph for describing the relationship between the floating variation of the head slider of the hard disk device shown in FIG. 1 and the length in the circumferential direction of the servo zone.

FIG. 13 is a graph for showing the relationship between the floating variation of the head slider 6 and the length in the circumferential direction of the servo zone. For normalization of the measurement result, the value which is obtained by normalizing the servo zone length with the head slider length, namely (servo zone length)/(head slider length), is used. A laser vibrometer is used for measurement, in which a reference beam as a standard is irradiated onto the glass disk surface (flat area with a width of 0.4 mm in the radial direction provided at the radius position of 20 mm, 25 mm, and 30 mm), and the measurement beam is irradiated onto the rear end of the head slider 6 for differentiation. As obvious from the figure, the floating variation of the head slider 6 increases with increasing of the servo zone length.

As described herein above, the floating variation caused by the servo zone may desirably be 20 nm p-p, more desirably 10 nm p-p for the floatation of 50 nm of the head slider 6, the value of (servo zone length)/(head slider length) may therefore be 0.3 or smaller, desirably 0.05 or smaller. Aside from these upper limit value, the possible smallest value is preferable for the lower limit value, the manufacturing limit that allows to form the servo zone and write the servo information is the lower limit. In other words, the value of (servo zone length)/(head slider length) may be a value not exceeding 0.3, or desirably a value not exceeding 0.05. From the above discussion, to suppress the tolerance of the floating variation of the servo zone to ±20%, more desirably ±10%, the servo zone length is prescribed to be the length 3/10 times the head slider length or shorter, or the length not exceeding 3/10, more desirably 1/20 or shorter, or the length not exceeding 1/20.

As described herein above, according to the present invention, the floating variation of a magnetic head on a magnetic disk is suppressed, the magnetic head can stably perform recording and regeneration of data.

The second embodiment is described as another method for solution.

If the ratio of the land and groove and the depth of the groove parallel to the moving direction of the head slider 6 are equal to the ratio of the land and groove and the depth of the groove perpendicular to the moving direction of the head slider 6, the flotation of the head slider 6 on the surface provided with the parallel land groove is larger than the floatation of the head slider 6 on the surface provided with the perpendicular land groove. Further, the flotation of the head slider 6 on the surface provided with mixed parallel land groove and perpendicular land groove to the moving direction of the head slider 6 is a floatation value between the floatation of the head slider 6 on the surface provided with parallel land groove and the floatation of the head slider 6 on the surface provided with perpendicular land groove. The floatation of the head slider 6 decreases more as the depth of parallel groove and perpendicular groove is deeper. (Refer to "Averaged Reynolds Equation Extended to Gas Lubrication Possessing Surface Roughness in the Slip Flow Regime: Approximate Method and Confirmation Experiments" ASME Journal of Tribology, vol. 111, 1989, pp. 495–503, Mitsuya et al.)

The data track DT and guard band GB on the data zone of the above-mentioned magnetic disk 3 is the same as the land groove parallel to the moving direction of the head slider 6, on the other hand, the servo track ST and servo pit SP of the servo zone is a mixture of the parallel land groove and perpendicular land groove to the moving direction of the head slider 6. Therefore, if the ratio of the data track DT and guard band GB on the data zone namely the ratio of land and groove, and the depth of the guard band GB namely the depth of the groove are equal to the ratio of the servo track ST and servo pit SP on the servo zone namely the ratio of land and groove, and the depth of the servo pit SP namely the depth of the groove, then the floatation of the head slider 6 on the data zone is larger than the floatation of the head slider 6 on the servo zone.

It is possible to equalize the floatation of the head slider 6 on the servo zone to the floatation of the head slider 6 on the data zone by reducing the depth of the groove on the servo zone to the level shallower than the depth of the groove on the data zone.

Otherwise, it is possible to equalize the floatation of the head slider 6 on the servo zone to the floatation of the head slider 6 on the data zone by increasing the ratio of land and groove on the serve zone to the level larger than the ratio of land and groove on the data zone to make the apparent depth of the groove on the servo zone shallow, while the depth of the groove on the servo zone remains equal to the depth of the groove on the data zone. The ratio of the data track DT and guard band GB on the data zone, namely the ratio of land and groove, is equal to the ratio of the band area in the rail width of the head slider 6 and the groove area in the rail width of the head slider 6. Similarly, the ratio of the servo track ST and servo pit SP, namely the ratio of land and groove, is equal to the ratio of the land area in the rail width of the head slider 6 and the groove area in the rail width of the head slider 6.

Further, the ratio of land and groove on the servo zone is brought to a level near the ratio of land and groove on the data zone. In detail, by providing groove parallel to the moving direction of the head slider 6 on the servo zone as much as possible in order to bring the floatation of the head slider 6 on the servo zone to the level near the floatation of the head slider 6 on the data zone, it is possible to suppress the floating variation of the head slider 6 during travel above the servo zone. However, in the case that the groove parallel to the moving direction of the head slider 6 on the servo zone is provided, from which groove the servo signal is not regenerated, generally to say, the servo capability is seriously lowered because of the ratio to the track width though it depends on the servo signal processing circuit. Therefore, the ratio of the width of groove parallel to the moving direction of the head slider 6 on the servo zone and the track width should be addressed for attention.

First, the relationship between the floating variation of the head slider 6 and the ratio of the depth of groove on the data zone and the depth of groove on the servo zone is examined.

A disk for the first measurement is glass-made, the data zone and servo zone are provided like the actual magnetic disk 3. The pattern of the data zone and servo zone is formed on the glass disk in the same manner as used for the actual magnetic disk 3. First, resist is coated on the glass disk surface, and the beam is irradiated onto the resist with pattern of the data zone and servo zone based on catting data. After the exposing, the pattern of the data zone and servo zone is formed through the first development by, for example, RIE (reactive ion etching). Then, the first-developed pattern is subjected to the second development using a mask having a pattern from which only data zone was cut off previously in order to deepen the depth of groove on the data zone to the level deeper than the depth of groove on the servo zone.

The data zone is divided to seven areas in the circumferential direction of the glass disk with interposition of a servo zone, The depth of the guard band GB on the data zone namely the depth of groove is different pending on areas as described herein under. The track pitch and track width on the data zone are 4.8 $\mu$m and 3.2 $\mu$m respectively, and the ratio of the data track DT and guard band GB, namely the ratio of land and groove LGR (Land-Groove Ratio) is 2.0.

| Area No. | Depth of groove |
| --- | --- |
| 1 | 100 nm |
| 2 | 200 nm |
| 3 | 267 nm |
| 4 | 333 nm |
| 5 | 400 nm |
| 6 | 600 nm |
| 7 | 734 nm |

The servo zone is formed not linearly from the inside periphery to the outside periphery like the zone, but 64 servo zones are formed in a curved shape along the seek locus of the head slider 6. The depth of the servo pit SP of the servo zone namely the depth of groove is 200 nm, and the ratio of the servo track ST and servo pit SP namely the ratio LGR of land and groove is 2.0.

The head slider is a usual taper flat 50% nano-slider with two rails, the slider length is 2.0 mm, slider width is 1.6 mm, rail width is 20 $\mu$m, and weight is 3.5 gf. When such head slider 6 is located at the 30.2 mm radius position of the magnetic disk and the magnetic disk is rotated at a rotational speed of 4000 rpm, the relative speed between the head slider and magnetic disk is 7.0 m/s, and the floatation of the head slider is about 50 nm.

Figure 14:
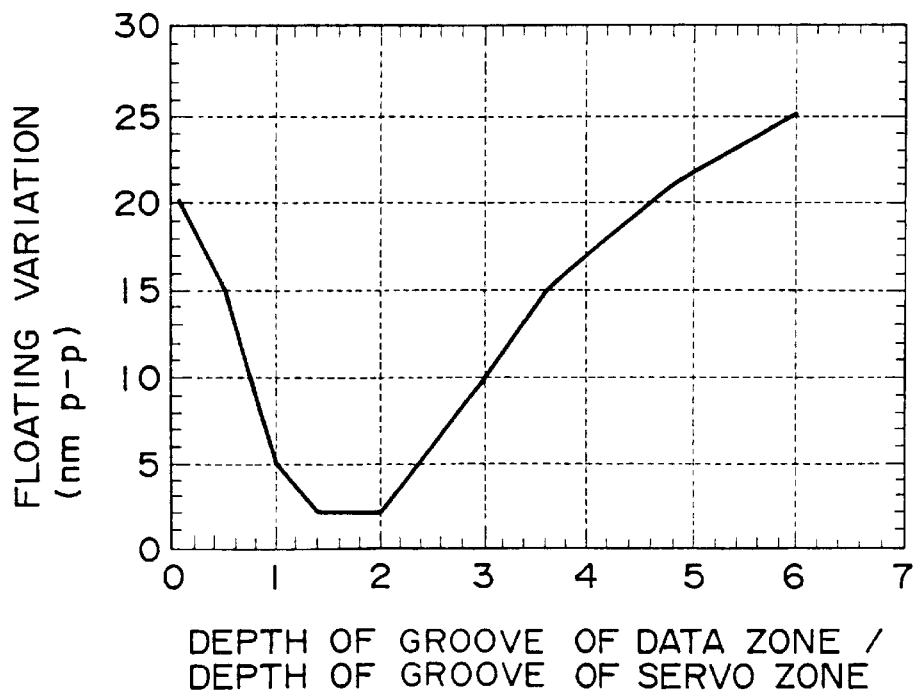
FIG. 14 is a graph for describing the relationship between the floating variation of the head slider of the hard disk device shown in FIG. 1 and the ratio of the depth of groove on the data zone and the depth of groove on the servo zone.

FIG. 14 is a graph for describing the relationship between the floating variation of the head slider 6 and the ratio of the depth of groove on the data zone and the depth of groove on the servo zone. A laser vibrometer is used for measurement, in which a reference beam as a standard is irradiated onto the glass disk surface (flat area with a width of 0.4 mm in the radial direction provided at the radius position of 20 mm, 25 mm, and 30 mm), and the measurement beam is irradiated onto the rear end of the head slider 6 for differentiation. As obvious from the figure, the floating variation of the head slider 6 decreases temporarily as the depth of groove on the data zone becomes deeper, however at a critical point, the floating variation of the head slider 6 turns to increase as the depth of groove on the data zone becomes deeper exceeding the critical value. As described herein above, the floating variation due to the servo zone for the floatation of the head slider of 50 nm may desirably be 20 nm p-p, more desirably 10 nm p-p, and the value of (depth of groove on the data zone)/(depth of groove on the servo zone) therefore may be in a range from 0.2 or larger to 4.7 or smaller, more desirably in the range from 0.8 or larger to 3.0 or smaller.

Next, the relationship between the floating variation and the ratio of land and groove on the data zone and the ratio of land and groove on the servo zone is examined.

A disk for the second measurement is glass-made, the data zone and servo zone are provided on the entire peripheral surface of the disk. The data zone and servo zone are formed on the glass disk in the same manner as used for the actual magnetic disk 3.

The data zone is divided to seven areas in the circumferential direction of the glass disk with interposition of a servo zone, and the ratio of the data track DT and guard band GB, namely the ratio of the land area in the rail width of the head slider 6 and the groove area in the rail width of the head slider 6, is different for each area. The depth of the guard band GB of the data zone namely the depth of groove is 200 nm.

| Area No. | Ratio of land area and groove area |
| --- | --- |
| 1 | 0.5 |
| 2 | 2.0 |
| 3 | 3.0 |
| 4 | 4.0 |
| 5 | 5.0 |
| 6 | 8.0 |
| 7 | 10.0 |

The servo zone is formed not linearly from the inside periphery to the outside periphery like the actual servo zone, but 64 servo zones are formed in a curved shape along the seek locus of the head slider 6. The depth the servo pit SP of the servo zone namely the depth of groove is 200 nm, and the ratio of the servo track ST and servo pit SP, namely the land area in the rail width of the head slider 6 and the groove area in the rail width of the head slider 6, is 2.0.

The head slider 6 is a usual taper flat 50% nano-slider with two rails, the slider length is 2.0 mm, slider width is 1.6 mm, rail width is 20 $\mu$m, and weight is 3.5 gf. When such head slider 6 is located at the 30.2 mm radius position of the magnetic disk and the magnetic disk is rotated at a rotational speed of 4000 rpm, the relative speed between the head slider and magnetic disk is 7.0 m/s, and the floatation of the head slider is about 50 nm.

FIG. 15 is a graph for describing the relationship between the floating variation of the head slider 6 and a quotient of the ratio of data track DT and guard band GB on the data zone namely the ratio of the land area in the rail width of the head slider 6 and the groove area in the rail width of the head slider 6 divided by the ratio of servo track ST and servo pit SP on the servo zone namely the ratio of the land area in the rail width of the head slider 6 and the groove area in the rail width of the head slider 6. The laser vibrometer is used for measurement, and as obvious form the figure, the floating variation of the head slider 6 decreases temporarily with the increasing of the above-mentioned quotient, but at a certain critical point, the floating variation of the head slider 6 turns to increase as the quotient increases more beyond the critical value. As described herein above, the floating variation due to the servo zone for the floatation of the head slider 6 of 50 nm may desirably be 20 nm p-p, more desirably 10 nm p-p, and the above-mentioned quotient may therefore be 6.7 or smaller, more desirably in a range from 1.0 or larger to 4.0 or smaller.

Finally, the floating variation of the head slider for a case that groove is provided additionally parallel to the moving direction of the head slider 6 in the servo zone is examined.

A disk for the third measurement is glass-made, the data zone and servo zone are provided on the entire peripheral surface of the disk. The data zone and servo zone are formed on the glass disk in the same manner as used for the actual magnetic disk 3.

The track pitch and track width of the data zone are 4.8 $\mu$m and 3.2 $\mu$m respectively, the depth of the guard band GB namely the depth of groove is 200 nm.

Figure 16:
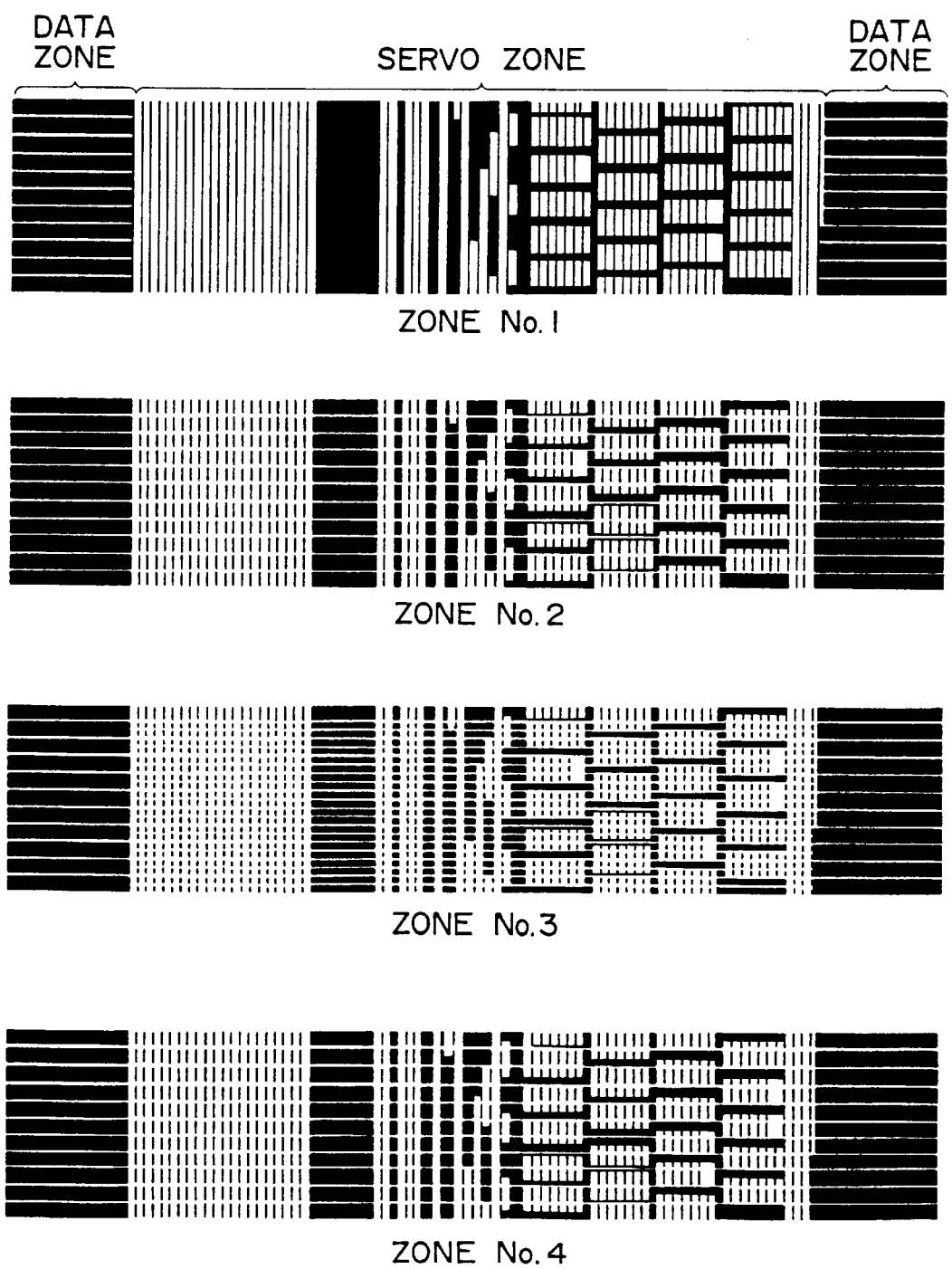
FIG. 16 is a diagram for illustrating the groove and land provided on each servo zone of a plurality of zones on the glass disk.

64/circle servo zones are formed on the glass disk, the grooves (land is shown black and groove is shown white) parallel to the moving direction of the head slider 6 provided on four area shown in FIG. 16 are different each other as described herein under. The servo zone is formed not linearly from the inside periphery to the outside periphery unlike the actual servo zone, but servo zones are formed in a curved shape along the seek locus of the head slider 6. The depth of the servo pit SP of the servo zone namely the depth of groove is 200 nm,

| Area No. | Interval of grooves | Width of groove |
| --- | --- | --- |
| 1 | | |
| 2 | 1 track pitch | 0.4 $\mu$m |
| 3 | 1/2 track pitch | 0.8 $\mu$m |
| 4 | 1 track pitch | 0.8 $\mu$m |

The head slider 6 is a usual taper flat 50% nano-slider with two rails, the slider length is 2.0 mm, slider width is 1.6 mm, rail width is 20 $\mu$m, and weight is 3.5 gf. When such head slider 6 is located at the 30.2 mm radius position of the magnetic disk and the magnetic disk is rotated at a rotational speed of 4000 rpm, the relative speed between the head slider and magnetic disk is 7.0 m/s, and the floatation of the head slider is about 50 nm.

Figure 17:
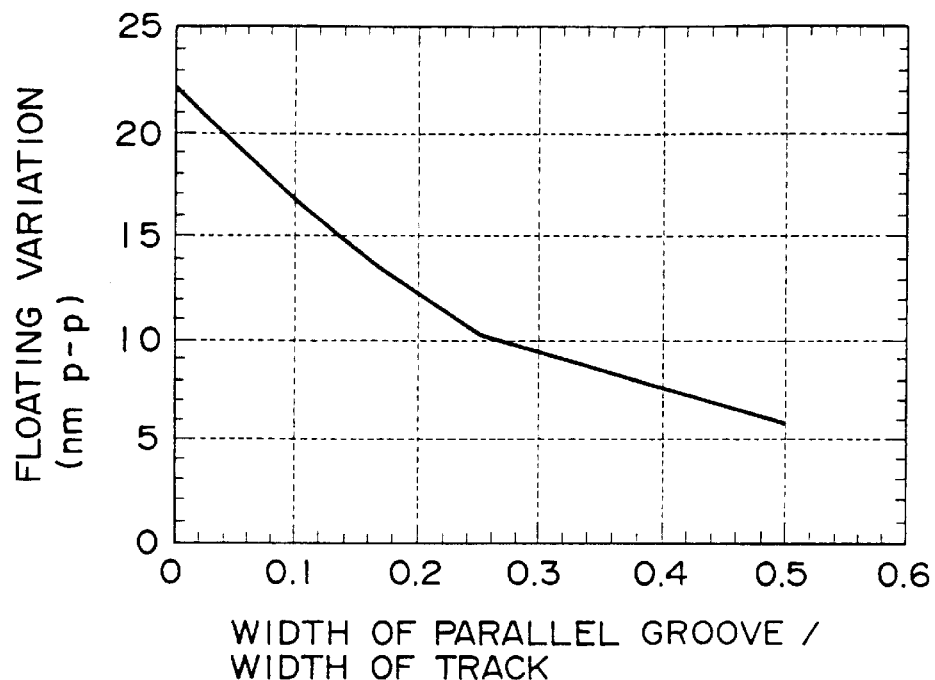
FIG. 17 is a graph for describing the relationship between the floating variation of the head slider of the hard disk device shown in FIG. 1 and the ratio of the width of groove parallel to the moving direction of the head slider 6 and the track width.

FIG. 17 is a graph for describing the relationship between the floating variation of the head slider 6 and the ratio of the width of groove parallel to the moving direction of the head slider 6 and the track width. A laser vibrometer is used for measurement, and as obvious from the figure, the floating variation of the head slider decreases with increasing of the ratio of the width of groove and track width. As described herein above, the floating variation due to the servo zone for the floatation of the head slider 6 of 50 nm may desirably be 20 nm p-p, more desirably 10 nm p-p, and the ratio of the width of groove and track width may therefore be 0.05 or larger, more desirably 0.27 or larger.

As described herein above, according to the present invention, the floating variation of a magnetic head on a magnetic disk is suppressed, the magnetic head can stably perform recording and regeneration of data.

The third embodiment is described herein under as another solution.

It is possible to minimize the apparent floating variation of the head slider 6 by causing waveform interference of the floating variation during travel of the head slider above the servo zone by using a magnetic disk 3 having a small servo zone interval and by utilizing the waveform interference. Because such waveform interference is utilized, the floating variation of the head slider 6 can be reduced to the negligible level by utilizing multi-interference.

The response frequency of the head slider 6 is generally high, the profile of the floating variation of the head slider 6 is seldom involved in waveform interference under the condition of the usual period used for the servo zone (for example, 4 KHz). Further, because the pattern in the servo zone is very complex and includes high-frequency component, the profile of the floating variation of the head slider 6 can not be analyzed by simple numeral analysis. In view of a solution, the relationship between the floating variation of the head slider 6 and the number of servo zones in the head slider length projected on the magnetic disk is examined.

The disk for measurement is a glass-made disk, and the same data zone and servo zone as the actual magnetic disk 3 are provided on the measurement disk. The data zone and servo zone are formed on a glass disk in the same manner as used for the actual magnetic disk 3. First, resist is coated on the glass disk surface, the coated resist is exposed using the pattern of the data zone and servo zone based on the cutting data. After exposing, the resist is developed by RIE (reactive ion etching) to form the pattern of the data zone and servo zone.

The track pitch and track width of the data zone are 4.8 $\mu$m and 3.2 $\mu$m respectively, the depth of the guard band GB, namely the depth of the groove, is 200 nm.

The servo zone is formed not linearly from the inside periphery to the outside periphery unlike an actual servo zone, but formed in curved configuration along the seek locus of the head slider 6. The number of servo zones in the head slider length projected on the glass disk is different for each three areas in the circumferential direction of the glass disk as shown herein under. The depth of the servo pit SP of the servo zone namely the depth of groove is 200 nm, and the servo track ST and servo pit SP are formed in the area between the radius of 15.5 mm to 35.0 mm of the glass disk.

| Area No. | Number of servo zones |
|---|---|
| 1 | 1.05 |
| 2 | 2.12 |
| 3 | 4.17 |

The head slider 6 is a usual taper flat 50% nano-slider with two rails, the slider length is 2.0 mm, slider width is 1.6 mm, rail width is 20 $\mu$m, and weight is 3.5 gf. When such head slider 6 is located at the 30.2 mm radius position of the magnetic disk and the magnetic disk is rotated at a rotational speed of 4000 rpm, the relative speed between the head slider and magnetic disk is 7.0 m/s, and the floatation of the head slider is about 50 nm.

Figure 18:
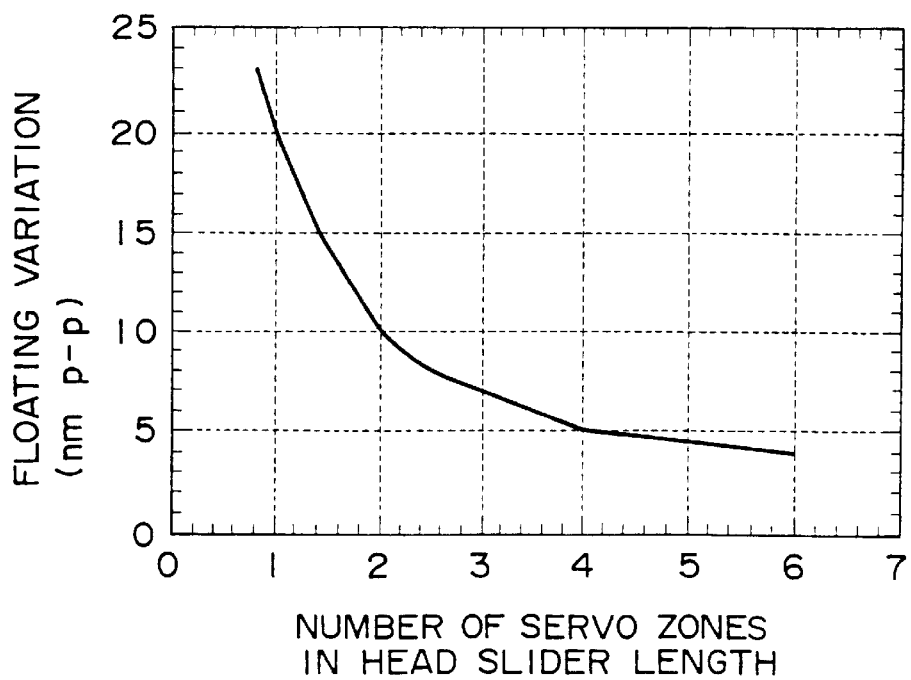
FIG. 18 is a graph for describing the relationship between the floating variation of the head slider of the hard disk device shown in FIG. 1 and the number of servo zones in the head slider length projected on the glass disk.

FIG. 18 is a graph for describing the relationship between the floating variation of the head slider 6 and the number of servo zones in the head slider length projected on the glass disk. A laser vibrometer is used for measurement, in which a reference beam as a standard is irradiated onto the glass disk surface (flat area with a width of 0.4 mm in the radial direction provided at the radius position of 20 mm, 25 mm, and 30 mm), and the measurement beam is irradiated onto the rear end of the head slider 6 for differentiation. As obvious from the figure, the floating variation of the head slider 6 decreases as the number of servo zones in the head slider length projected on the glass disk increases. In other words, the floating variation will be decreased if the train of servo zones are entirely or partially provided on each projection length of the head slider 6. As described herein above, the floating variation due to the servo zone for the floatation of the head slider of 50 nm may desirably be 20 nm p-p, more desirably 10 nm p-p, the number of servo zones in the head slider length projected on the glass disk may be therefore 1 or more, more desirably 2 or more. The lower limit value is given herein, on the other hand, the upper limit is desirably more as much as possible, and the manufacturing limit that allows to form the servo zone and write the servo information is the lower limit.

As described herein above, according to the present invention, the floating variation of a magnetic head on a magnetic disk is suppressed, the magnetic head can stably perform recording and regeneration of data.

The fourth embodiment is described hereinafter as another solution. It is possible to reduce the floating variation of the head slider 6 by minimizing the depth of the guard band GB and servo pit SP of the magnetic disk 3, or the depth of groove of data zone and servo zone, in other words, the step difference between the data track DT and guard band GB and the step difference between the servo track ST and servo pit SP, or the step difference between land and groove on the data zone and servo zone respectively. The relationship between the floating variation of the head slider 6 and the step difference between land and groove respectively on the data zone and servo zone is examined.

The disk for measurement is a glass-made disk, and the same data zone and servo zone as those of the actual magnetic disk 3 are provided on the measurement disk. The data zone and servo zone are formed on a glass disk in the same manner as used for the actual magnetic disk 3. First, resist is coated on the glass disk surface, the coated resist is exposed using the pattern of the data zone and servo zone based on the cutting data. After the exposing, the resist is developed by RIE (reactive ion etching) to form the pattern of the data zone and servo zone. The step difference between land and groove is varied by adjusting the thickness of resist and developing time.

The track pitch and track width of the data zone are 4.8 $\mu$m and 3.2 $\mu$m respectively.

The servo zone is formed not linearly from the inside periphery to the outside periphery unlike an actual servo zone, but formed in curved configuration along the seek locus of the head slider 6. The servo track ST and servo pit SP are formed in the zone between the radius of 15.5 mm to 35.0 mm of the glass disk.

The head slider 6 is a usual taper flat 50% nano-slider with two rails, the slider length is 2.0 mm, slider width is 1.6 mm, rail width is 20 $\mu$m, and weight is 3.5 gf. When such head slider 6 is located at the 30.2 mm radius position of the magnetic disk and the magnetic disk is rotated at a rotational speed of 4000 rpm, the relative speed between the head slider and magnetic disk is 7.0 m/s, and the floatation of the head slider is about 50 nm.

Figure 19:
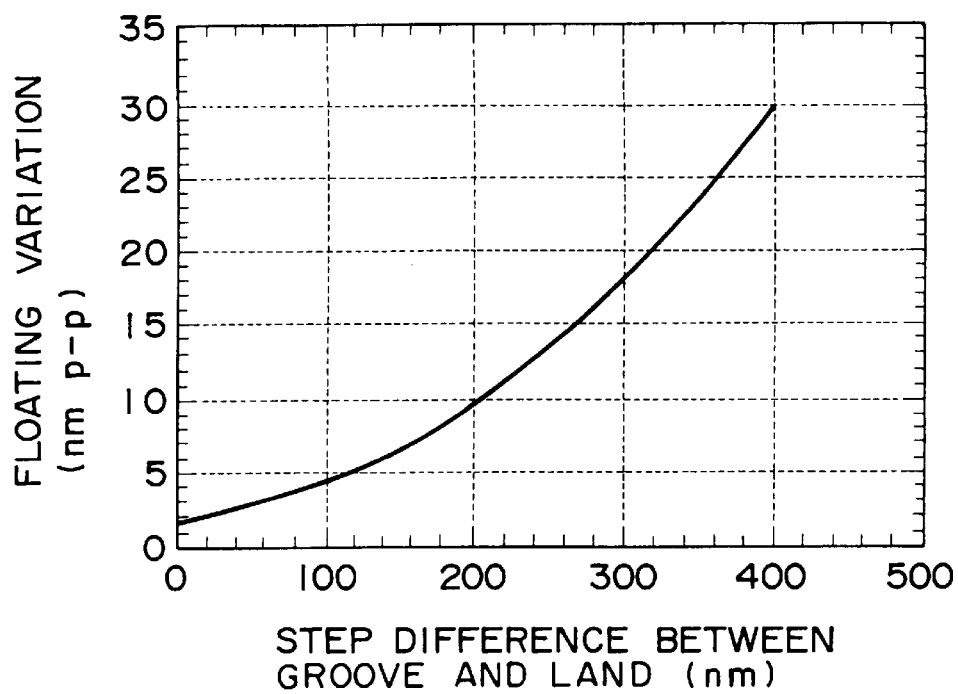
FIG. 19 is a graph for describing the relationship between the floating variation of the head slider of the hard disk device shown in FIG. 1 and the step difference between land and groove respectively on the data zone and servo zone.

FIG. 19 is a graph for describing the relationship between the floating variation of the head slider 6 and the step difference between land and groove respectively on the data zone and servo zone. A laser vibrometer is used for measurement, in which a reference beam as a standard is irradiated onto the glass disk surface (flat area with a width of 0.4 mm in the radial direction provided at the radius position of 20 mm, 25 mm, and 30 mm), and the measurement beam is irradiated onto the rear end of the head slider 6 for differentiation. As obvious from the figure, the floating variation of the head slider 6 decreases as the step difference between land and groove respectively on the data zone and servo zone decreases. As described herein above, the floating variation due to servo zone for the floatation of the head slider 6 of 50 nm may desirably be 20 nm p-p, more desirably 10 nm p-p, the step difference between land and groove respectively on the data zone and servo zone may be therefore 320 nm or lower, more desirably 200 nm or lower. The lower limit value is given herein, on the other hand, the upper limit is desirably more as much as possible, however, the lower limit is restricted because two step magnetization involving additional magnetization for magnetizing only land portion is required after the first magnetization for simultaneously magnetizing land and groove portion respectively on the data zone and servo zone.

Figure 20:
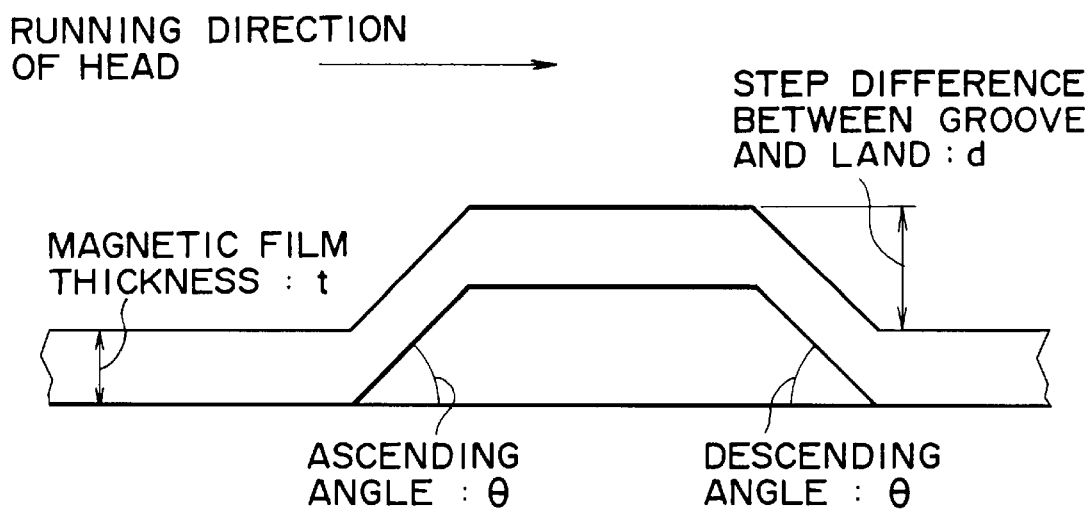
FIG. 20 is a cross-sectional side view for illustrating the configuration of the land and groove on the data zone and servo zone of the magnetic disk.

The possibility whether two step magnetization can be applied depends on the steepness of magnetic field distribution of the magnetization magnetic head, and the magnitude of ascending angle and descending angle of the land and groove on the data zone and servo zone (refer to FIG. 20). Accordingly, if the magnetic field from the magnetization magnetic head satisfies the equation 1 on the magnetic disk surface, the two step magnetization is theoretically applicable.

[Equation 1]

$$\delta B/\delta X \cdot (d-t) \cdot \tan \theta > Hc$$

B: MAGNETIC FLUX DENSITY OF MAGNETIZATION MAGNETIC HEAD
D: STEP DIFFERENCE BETWEEN GROOVE AND LAND OF DATA ZONE AND SERVO ZONE
t: FILM THICKNESS OF MAGNETIC FILM
θ: ASCENDING ANGLE AND DESCENDING ANGLE OF LAND AND GROOVE
Hc: COERCIVE FORCE OF MAGNETIC FILM

According to the equation 1, it is theoretically possible to apply the two step magnetization in order to magnetize the land and groove on the data zone and servo zone as long as the step difference between the land and groove on the data zone and servo zone is not smaller than the film thickness of the magnetic film.

The step difference between the land and groove on the data zone and servo zone to which the two step magnetization is applicable is examined. A disk for measurement that the above-mentioned glass disk is subjected to spattering to form a magnetic film on the disk is used. The material used for the magnetic film is cobalt-chromium-platinum (CoCrPt), the coercive force (HCl) of the material is 2000 Oe. The magnetic film comprise 5 nm of carbon (C), 10 nm of chromium (Cr), 10 nm of cobalt-chromium-platinum (CoCrPt), and 10 nm of carbon in the order from the substrate. In order to make the magnetic field distribution of the magnetization magnetic head steep, the gap length is 0.2 μm, head slider floatation is 50 nm, and throat height is 0.2 μm, iron nitride-based material having a Bs (saturation magnetic flux density) of 13 kG is used as a core material.

For magnetization, first, the first magnetization current of 60 mA o-p is supplied to the magnetization magnetic head, and the land and groove on the data zone and servo zone are temporarily magnetized by the magnetic field from the magnetization magnetic head. Then, the second magnetization current is supplied to the magnetization magnetic head, and only the land on the data zone and servo zone is magnetized by the magnetic field from the magnetization magnetic head. The magnitude of the second magnetization current is significantly different dependently on the characteristics of the magnetic film and magnetization magnetic head and the step difference between the land and groove on the data zone and servo zone. The amplitude value of the magnetic signal from the land and groove on the data zone and servo zone is observed while the magnetization current is gradually increasing to find the maximum value of the second magnetization current, and the maximum value is regarded as the amplitude value of the magnetic signal at the step difference between the land and groove on the data zone and servo zone.

Figure 21:
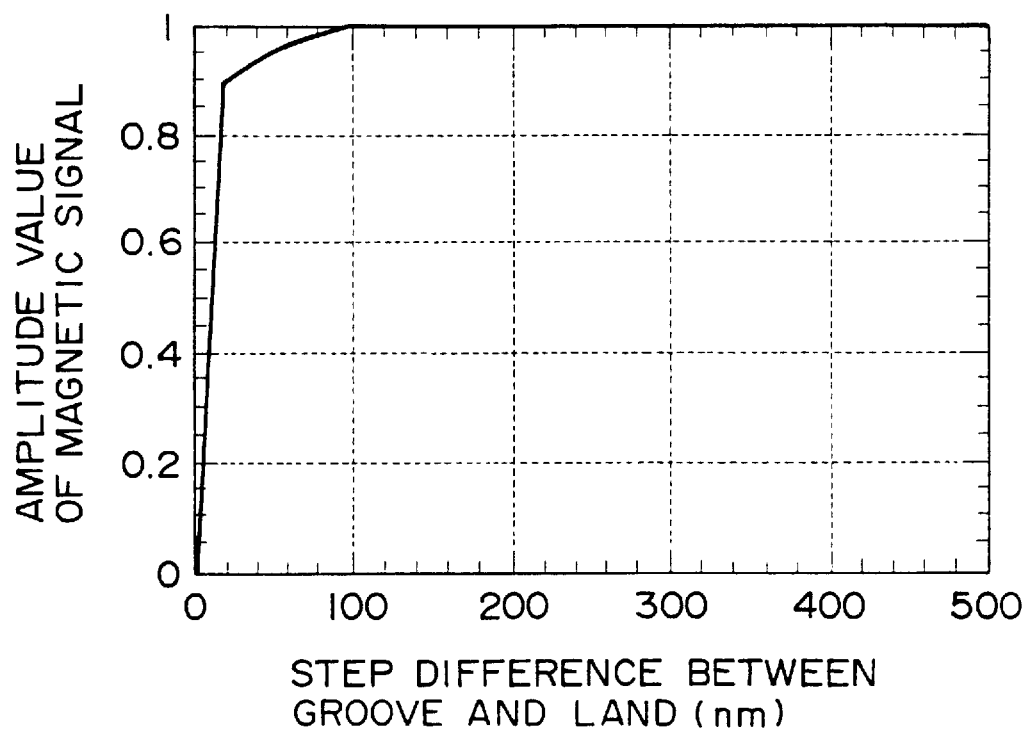
FIG. 21 is a graph for describing the relationship between the amplitude value of the magnetic signal and the step difference between the land and groove on the data zone and servo zone.

FIG. 21 is a graph for describing the relationship between the amplitude value of the magnetic signal and the step difference between the land and groove on the data zone and servo zone. As obvious from the figure, The amplitude value of the magnetic signal begins to decrease at the point just smaller than the step difference between the land and groove on the data zone and servo zone of 100 nm, and the amplitude value of the magnetic signal begins to decrease steeply around the step difference between the land and groove on the data zone and servo zone of 20 nm or smaller. Accordingly, the lower limit of the step difference between the land and groove on the data zone and servo zone may desirably be 20 nm, more desirably 100 nm.

As described herein above, according to the present invention, the floating variation of a magnetic head on a magnetic disk is suppressed, the magnetic head can stably perform recording and regeneration of data.

The fifth embodiment is described herein under as another solution.

In the above-mentioned magnetic disk 3, the head slider 6 is supported by the land and groove of the magnetic disk 3. For example, assuming that the pressure from the magnetic disk 3 applied to the head slider 6 is constant in the direction perpendicular to the moving direction of the head slider 6, it is true for the two rail taper flat slider, the pressure from the head slider 6 applied to the land and groove of the magnetic disk 3 is dominantly controlled by the ratio of the land area and groove area of the magnetic disk 3. Herein, the ratio of the land area and groove area is defined by the equation 2 and equation 3, wherein LR+GR=1.

[Equation 2]

$$LR = Sl/(Sl+Sg)$$

LR: AREA RATIO OF LAND ZONE OCCUPYING IN SURFACE AREA OF MAGNETIC DISK 3 UNDER PROJECTION OF HEAD SLIDER 6
Sl: AREA OF CONVEX OF MAGNETIC DISK 3 UNDER PROJECTION OF HEAD SLIDER 6
Sg: AREA OF GROOVE OF MAGNETIC DISK 3 UNDER PROJECTION OF HEAD SLIDER 6

[Equation 3]

$$GR = Sg/(Sl+Sg)$$

GR: AREA RATIO OF GROOVE ZONE OCCUPYING IN SURFACE AREA OF MAGNETIC DISK 3 UNDER PROJECTION OF HEAD SLIDER 6

Assuming the step difference between land and groove of the magnetic disk 3 is d, the spring constant of the air film formed between the head slider 6 and the land and groove is represented by the equation 4 from the equation 1.

[Equation 4]

$$kG = L \cdot (g/(h+d))$$

$$kL = L \cdot (g/h)$$

kG: SPRING CONSTANT OF GROOVE
kL: SPRING CONSTANT OF LAND
h: FLOATATION OF HEAD SLIDER FROM LAND
d: STEP DIFFERENCE BETWEEN LAND AND GROOVE

Figure 22:
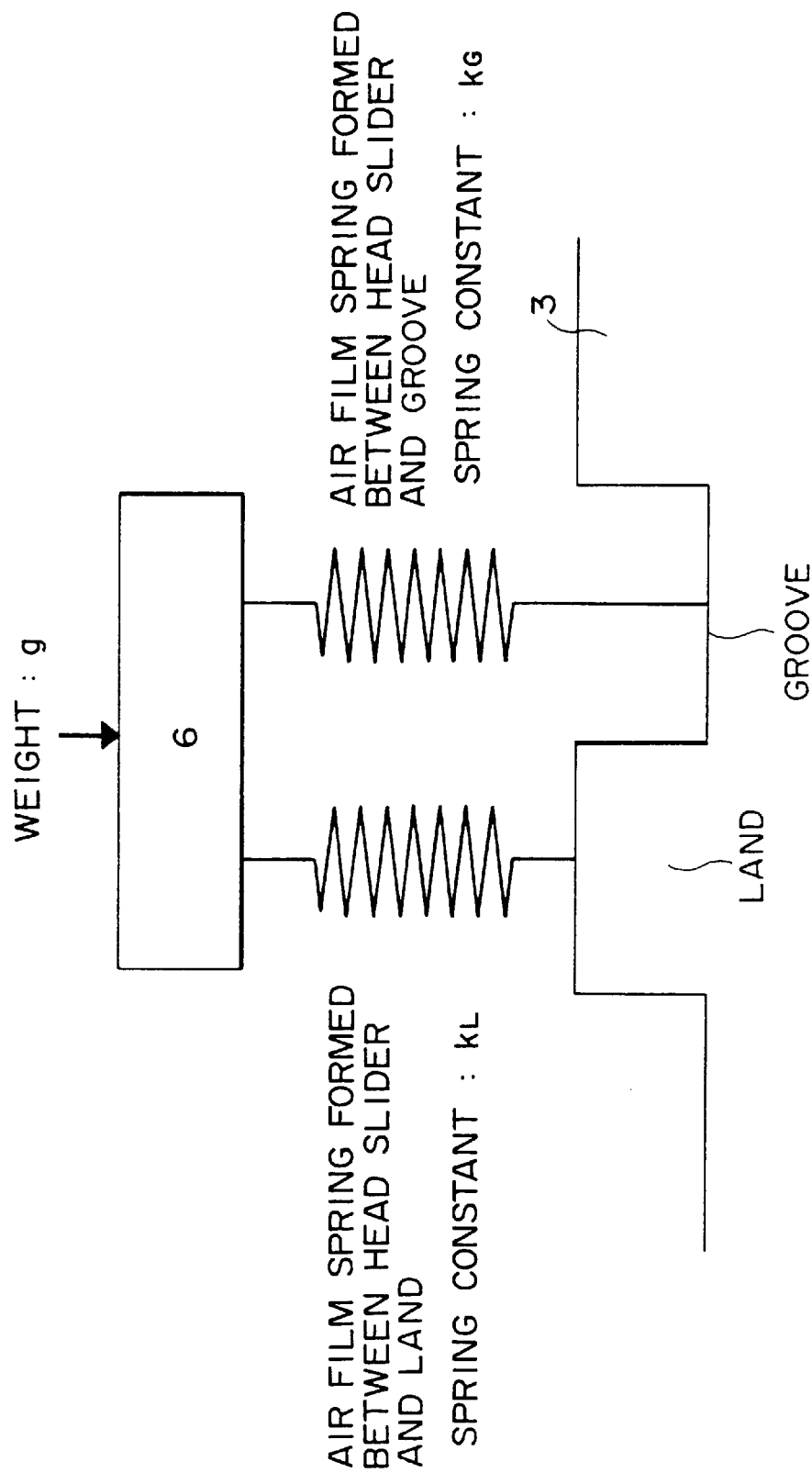
FIG. 22 is a model diagram for determining the spring constant of the air film formed between the magnetic disk and head slider.

A model as shown FIG. 22 is assumed to calculate the spring constant of the air film formed between the magnetic disk 3 and head slider 6. The head slider 6 is supported by the air film formed between the magnetic disk 3 and the land and the air film formed between the magnetic disk 3 and the groove. These two springs are assumed to be simultaneously deformed uniformly, and the contribution proportion of each spring is assumed to depend on the ratio of the land and groove of the magnetic disk 3. Therefore, for the conventional magnetic disk, GR=0 and LR=1.0.

Using the model shown in FIG. 22, the composite spring constant kC of two springs is calculated as the equation 6 from the equation 5.

[Equation 5]

$$-LR \cdot kL \cdot 1 = \eta \cdot g$$

$$-GR \cdot kG \cdot 1 = (1 - \eta) \cdot g$$

1: DISTANCE OF SPRING ELONGATION
η: RATIO OF WEIGHT LOADED ON AIR FILM FORMED BETWEEN LAND AND HEAD SLIDER

[Equation 6]

$$kC = GR \cdot kG + LR \cdot kL$$

The spring constant kL of the air film formed between the conventional magnetic disk and the head slider 6, which magnetic disk has the same floatation of the head slider 6 on the magnetic disk 3 as the magnetic disk of the present invention, is compared with kC by subtracting kC from kL.

[Equation 7]

$$kL - kC = kL - (GR \cdot kG + LR \cdot kL) = (1 - LR) \cdot kL - GR \cdot kG = GR \cdot (kL - kG)$$

Accordingly, the equation 8 is derived from the equations 3 and 4.

[Equation 8]

$$GR \geq 0 \, kL - kG \geq 0$$

In the equation 8, GR=0 when the ratio of the groove is equal to 0, that is, when the magnetic disk is a conventional magnetic disk. kL−kG=0 when the step difference between the land and groove is equal to 0, that is, when the magnetic disk is a conventional magnetic disk. The spring constant of the air film formed between the magnetic disk 3 and the head slider 6 can be reduced to the level smaller than the spring constant of the air film formed between a conventional magnetic disk and the head slider 6.

From the equation 6, it is understandable that the spring constant of the air film formed between the magnetic disk 3 and the head slider 6 can be reduced by increasing the ratio of groove. Therefore, if the width of land which maximizes the ratio of groove is made equal to the track width, the spring constant of the air film formed between the magnetic disk 3 and head slider 6 can be minimized without degradation of recording density. In other words, the groove provides the head slider 6 the dynamic pressure required for the head slider 6 to be floated near the land.

The floatation of the head slider 6 is examined using a disk for measurement prepared as described herein under. The measurement disk is glass-made, and lands and grooves are formed concentrically and regularly. The data zone and servo zone are formed on a glass disk in the same manner as used for the actual magnetic disk 3. First, resist is coated on the glass disk surface, the coated resist is exposed using the pattern of the data zone and servo zone based on the cutting data. After the exposing, the resist is developed by RIE (reactive ion etching) to form the pattern of the data zone and servo zone.

As shown in FIG. 23, the width of the land is 3.2 μm, and the width of groove is 1.6 μm. The concentric pattern of land and groove is formed in the area between the radius of 15.5 mm to 20.5 mm of the glass disk, and a flat area with a width of 0.4 mm for measurement of floatation is formed near the center of the pattern.

The head slider 6 is a usual two-rail taper flat nano-slider, the slider length is 2.0 mm, slider width is 1.6 mm, rail width is 200 μm, and weight is 3.5 gf. A rail for measurement with a width of 50 μm is provided between the rail and rail, namely on the center line of the head slider 6. The width of this rail is sufficiently thin in comparison with that of other two rails, this rail does therefore not influence the floatation of the head slider.

First, the glass disk is rotated at a rotational speed sufficient to float the head slider 6, and the floatation is measured by a floatation meter while the rotational speed is slowly lowered until the head slider 6 touches the glass disk.

FIG. 24A is a graph for describing the relationship between the floatation of the head slider 6 and the relative speed between the glass disk and head slider 6 on the flat plane. FIG. 24B is a graph for describing the relationship between the floatation of the head slider 6 and the relative speed between the glass disk and head slider 6 on the land groove plane.

The floatation of the head slider 6 on the flat plane fluctuates around the relative speed of 1.5 m/s, it suggests the contact of the head slider 6 with the glass disk. The floatation of the head slider 6 just before the contact is 21.7 nm.

On the other hand, the floatation of the head slider 6 on the land groove plane does not fluctuate even at the relative speed of 12.1 m/s, and the value is small. The floatation of the head slider 6 is 15.6 nm at the relative speed of 12.1 m/s.

As concluded from the above-mentioned discussion, the floatation of the head slider 6 on a land groove plane is smaller than the floatation of the head slider 6 on a flat plane for the same head slider 6, and the head slider 6 can float more stably on a land groove plane than on a flat plane.

The configuration of the head slider 6 and the land groove is not limited to the above-mentioned configuration in this embodiment.

As described herein above, according to the present invention, the floating variation of a magnetic head on a magnetic disk is suppressed, the magnetic head can stably perform recording and regeneration of data.

The sixth embodiment is described herein under as another solution.

To evaluate the variation of the floatation of the head slider 6, it is preferable to determine the floating variation directly. However, the direct determination of the floating variation is difficult because convergent calculation should be used. The load capacity which is derived from the calculation of pressure exerted to the head slider 6 when the floatation and attitude of the head slider 6 are fixed at arbitrary floatation and attitude is likely used as a parameter to evaluate the variation of floatation of the head slider 6. The load capacity of the head slider 6 can be calculated without using convergent calculation and the calculation of the load capacity is easier than the direct calculation of the floating variation of the head slider 6. However, because the load capacity of the head slider 6 is derived by static numerical analysis, the load capacity could be unsuitable as the parameter for analyzing dynamic characteristics such as the variation of floatation of the head slider 6 during travel above the servo zone.

The number of servo zones on the above-mentioned magnetic disk 3 is about 60 to 80, and the size of a servo zone is about 0.2 mm though the size is different between the inside periphery and outside periphery of the magnetic disk 3. The period of the servo zone is about 2.5 mm assuming that the number of zones is 60. The magnetic disk 3 generally rotates at a speed of 3600 rpm, accordingly one cycle is 16.7 ms.

The head slider 6 is supported and floated by the air film formed between the rails 6a and 6b and the surface of the magnetic disk 3. In the pressure distribution on the rails 6a and 6b, the pressure is maximum at the position 0.2 mm inside from the rear end of the rails 6a and 6b, the head slider 6 is therefore supported and floated by this portion. Accordingly, the actual condition can be regarded as a virtual condition in which an object with a size of 0.2 mm is running on the land groove of 0.2 mm with an interval of 2.5 mm. From the above-mentioned discussion, the load capacity of the head slider 6 is concluded to be suitable as a parameter to evaluate the variation of floatation of the head slider 6.

First, the relationship between the load capacity and the land groove is examined.

Figure 25:
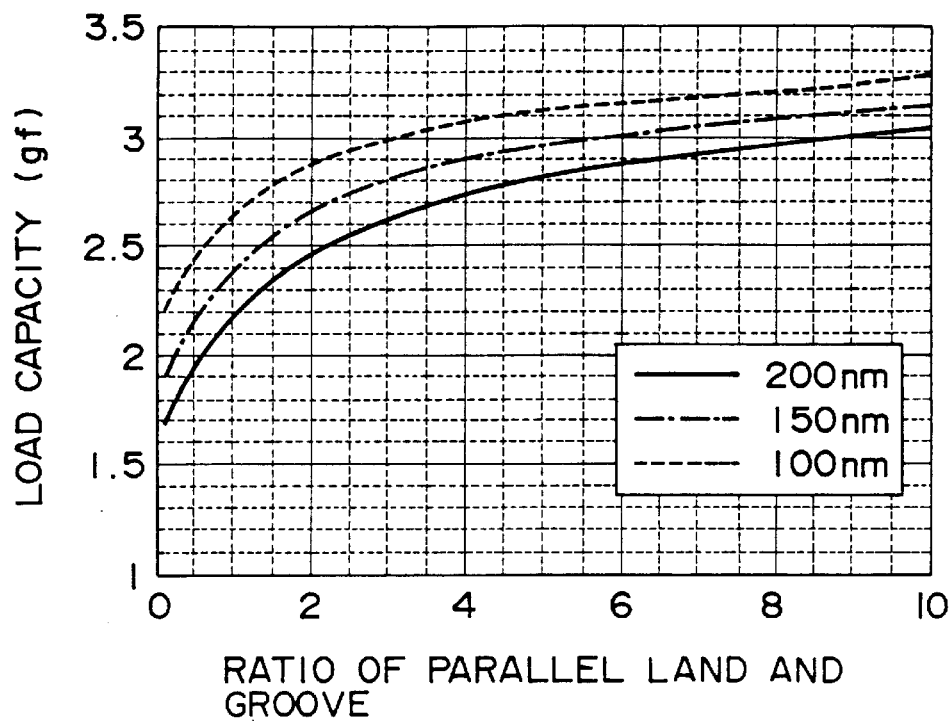
FIG. 25 is a graph for describing the relationship between the load capacity of the head slider of the hard disk device shown in FIG. 1 and the ratio of the land and groove parallel to the moving direction of the head slider 6.
Figure 26:
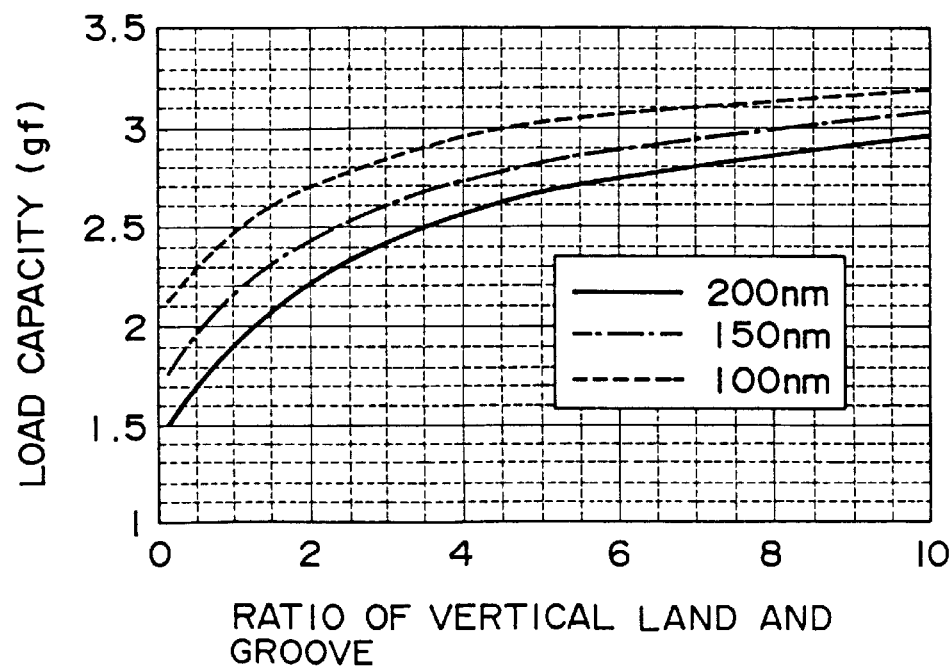
FIG. 26 is a graph for describing the relationship between the load capacity of the head slider of the hard disk device shown in FIG. 1 and the ratio of the land and groove perpendicular to the moving direction of the head slider 6.
Figure 27:
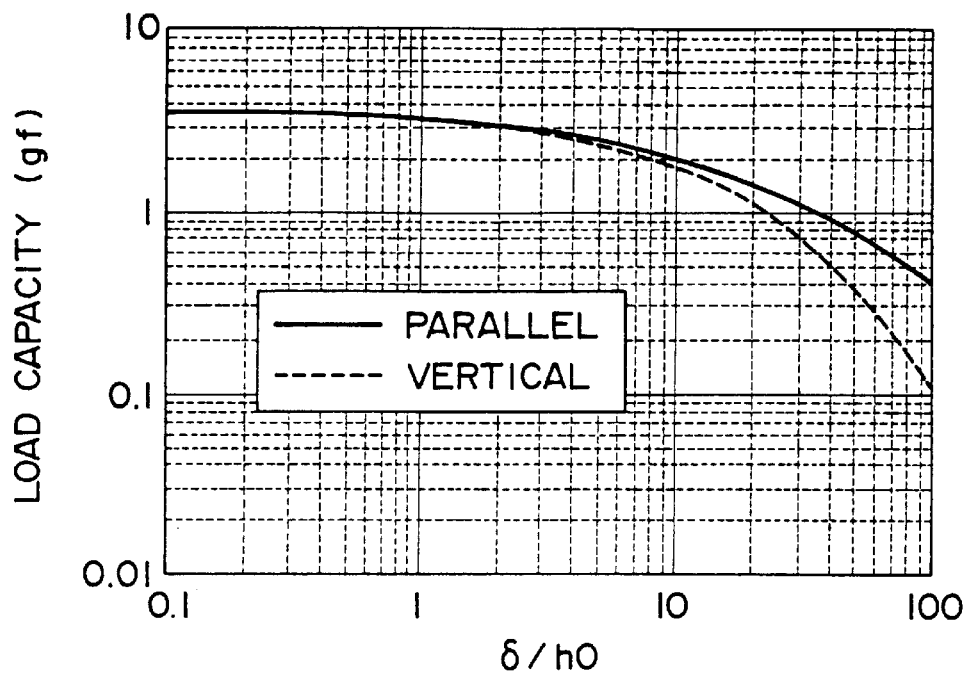
FIG. 27 is a graph for describing the relationship between the load capacity of the head slider of the hard disk device shown in FIG. 1 and the ratio of the depth of groove parallel and perpendicular to the moving direction of the head slider to the arbitrary floatation of the head slider.

FIG. 25 is a graph for describing the relationship between the load capacity of the head slider 6 and the ratio of land and groove parallel to the moving direction of the head slider 6. FIG. 26 is a graph for describing the relationship between the load capacity of the head slider 6 and the ratio of land and groove perpendicular to the moving direction of the head slider 6. FIG. 27 is a graph for describing the relationship between the load capacity of the head slider 6 and the ratio of the depth of groove parallel and perpendicular to the moving direction of the head slider 6 to the arbitrary floatation of the head slider 6. Herein, numerals for solid lines, chained lines, and dotted lines represent the depth of groove.

The average gap theory is used for calculation of the load capacity of the head slider 6. In detail, if the ratio of land and groove and depth of groove parallel to the moving direction of the head slider 6 are equal to the ratio of land and groove and depth of groove perpendicular to the moving direction of the head slider 6, the floatation of the head slider 6 on a plane provided with parallel land groove is larger than the floatation of the head slider 6 on a plane provided with perpendicular land groove. Further, the floatation of the head slider 6 on the plane provided mixed parallel land groove and perpendicular land groove to the moving direction of the head slider 6 falls in a value between the floatation of the head slider 6 on a plane provided with parallel land groove and the floatation of the head slider 6 on a plane provided with perpendicular land groove. The deeper depth of parallel groove and perpendicular groove gives the smaller floatation of the head slider 6. (refer to "Averaged Reynolds Equation Extended to Gas Lubrication Possessing Surface Roughness in the Slip Flow Regime; Approximate Method and Confir- mation Experiments" ASME Journal of Tribology, vol. 111, 1989, pp., 495–503, Mitsuya et al,)

As obvious from FIG. 13, FIG. 14, and FIG. 15, the load capacity of the head slider 6 is different dependently on the direction of land groove and the depth of groove although the ratio of land and groove is equal. Basically, the data track DT and guard band GB on the data zone of the magnetic disk 3 is the land groove parallel to the moving direction of the head slider 6, and the servo track ST and servo pit SP on the servo zone is the land groove perpendicular to the moving direction of the head slider 6. In manufacturing of one magnetic disk 3, it is difficult to differentiate the depth of guard band GB from the depth of servo pit SP because the differentiation introduces the complexity in the manufacturing process. Therefore, it is preferable to equalize the depth of guard band GB to the depth of servo pit SP in one magnetic disk 3. From the above-mentioned discussion, the equalization of the load capacity of the head slider 6 of the data zone to that of servo zone is regarded as the equalization of the load capacity of the head slider 6 of the land groove parallel to the moving direction of the head slider 6 to that of the land groove perpendicular to the moving direction of the head slider 6.

As described above, the calculation of the load capacity of the head slider 6 is easy, but it is difficult to determine the absolute value of actual floatation of the head slider 6. To know that what difference of the load capacity of the head slider 6 results in what difference of the actual floatation of the head slider 6, first, the relationship between the load capacity difference of the head slider 6 and the floatation difference of the head slider 6 is examined.

The first disk for measurement is glass-made, an area on which the pattern of the data zone is formed is provided on a half peripheral surface of the disk, and another flat area on which no pattern is formed is provided on the other half peripheral surface of the disk. The data zone pattern is formed on the glass disk in the same manner as used for the actual magnetic disk 3. First, resist is coated on the glass disk surface, the coated resist is exposed using the pattern of the data zone based on the cutting data. After the exposing, the resist is developed by RIE (reactive ion etching) to form the pattern of the data zone.

The track pitch and track width of the data zone are 4.8 $\mu$m and 3.2 $\mu$m respectively, the ratio of the data track DT and guard band GB, namely the ratio of the land and groove LGR (Land-Groove Ratio) is 2.0, and the depth of guard band GB namely the depth of groove is 200 nm. In FIG. 27, if the head slider 6 is floating at the floatation of 50 nm, this floatation corresponds to the load capacity of the head slider 6 of 3.5 on the flat area, and to the load capacity of the head slider 6 of 2.7 on the data zone. A laser vibrometer is used for measurement, in which a reference beam as a standard is irradiated onto the glass disk surface (flat area with a width of 0.4 mm in the radial direction provided at the radius position of 20 mm, 25 mm, and 30 mm), and the measurement beam is irradiated onto the rear end of the head slider 6 for differentiation. The difference between the floatation of the head slider 6 on the flat area and the floatation of the head slider 6 on the data zone is 30 nm. Therefore, the load capacity difference of 1 corresponds to the floatation difference of the head slider 6 of 37.5 nm.

Next, the possibility of reduction of the floating variation of the head slider 6 during travel above the servo zone by equalizing the load capacity of the head slider 6 of the data zone to that of the servo zone, and the possibility of suitable use of the load capacity of the head slider 6 which is obtained by static analysis as a parameter of the variation of the floatation of the head slider 6 during travel above the servo zone which is a dynamic behavior are confirmed.

The second disk for measurement is glass-made, however the servo zone does not have the actual servo track and servo pit, but is the area on which a simple repeated land and groove pattern is formed. The pattern of data zone and servo zone is formed on the glass disk in the same manner as used for the actual magnetic disk 3.

The data zone is divided to seven areas in the circumferential direction of the glass disk with interposition of a servo zone, and the ratio of the data track DT and guard band GB namely the ratio of land and groove is different for each area. The track pitch on the data zone is 4.8 μm, and the depth of the guard band GB is 200 nm.

| Area No. | LGR |
|---|---|
| 1 | 1.0 |
| 2 | 1.5 |
| 3 | 2.0 |
| 4 | 2.3 |
| 5 | 3.2 |
| 6 | 3.8 |
| 7 | 5.5 |

The servo zone is formed not linearly from the inside periphery to the outside periphery unlike an actual servo zone, but 64 servo zones are formed in curved configuration along the seek locus of the head slider 6. The depth of the servo pit SP of the servo zone namely the depth of groove is 200 nm, and the ratio of the servo rack ST and servo pit SP namely the ratio of land and groove LGR is 5.5.

The head slider 6 is a usual taper flat 50% nano-slider with two rails, the slider length is 2.0 mm, slider width 1.6 mm, rail width is 20 μm, and weight is 3.5 gf. When such head slider 6 is located at the 30.2 mm radius position of the magnetic disk and the magnetic disk is rotated at a rotational speed of 4000 rpm, the relative speed between the head slider and magnetic disk is 7.0 m/s, and the floatation of the head slider is about 50 nm.

Figure 28:
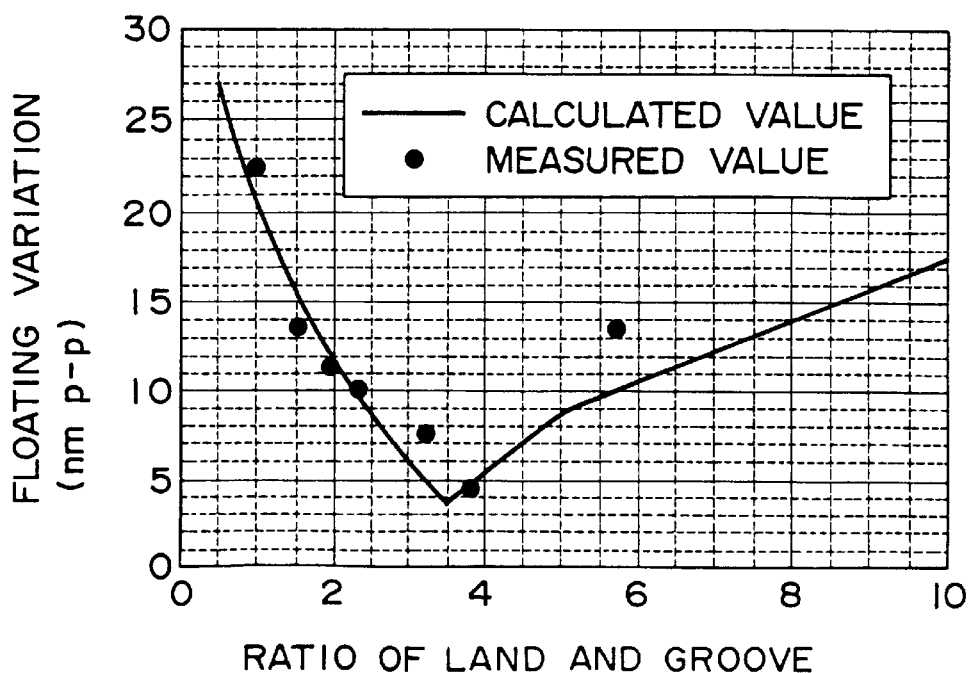
FIG. 28 is a graph for describing the relationship between the floating variation of the head slider of the hard disk device shown in FIG. 1 and the ratio of land and groove.

FIG. 28 is a graph for describing the relationship between the floating variation of the head slider 6 and the ratio of the data track DT and guard band GB namely the ratio of land and groove LGR. The result obtained by measurement using a laser vibrometer is shown in FIG. 28 with a solid line, and the floating variation calculated from the load capacity of the head slider 6 (the value to which the error due to waviness of the substrate 31 of 3.5 nm is simply added) is shown in FIG. 28 with black circles. The measurement almost agrees with the calculation. From this result, it is concluded that the load capacity of the head slider 6 which is obtained by static analysis can be suitably used as a parameter of the variation of the floatation of the head slider 6 during travel above the servo zone which is a dynamic behavior. At the ratio of the data track DT and guard band GB LGR of 3.8 corresponding to the load capacity of the head slider 6 at the ratio of the servo track ST and servo pit SP LGR of 5.5, the variation of the floatation of the head slider 6 during travel above the servo zone is nearly 0. From the above discussion, it is concluded that the equalization of the load capacity of the head slider of the data zone to that of the servo zone is effective to reduce the variation of the floatation of the head slider during travel above the servo zone.

As described herein above, according to the present invention, the floating variation of a magnetic head on a magnetic disk is suppressed, the magnetic head can stably perform recording and regeneration of data.

What is claimed is:

1. A magnetic disk unit comprising:
   a magnetic disk;
   a magnetic head mounted on floating head slider for recording and regeneration of data a surface of said magnetic disk, said magnetic disk being radially divided into a data recording zone and a control signal recording zone by lands and grooves formed on the surface, the control signal recording zone having a circumferential length not exceeding 3/10 times the length of said head slider.

2. A magnetic disk device having:
   a magnetic disk radially divided into a data recording zone and a control signal recording zone by lands and grooves formed on a surface of the magnetic disk;
   a head slider floating above the surface of said magnetic disk and caused to move relatively in a radial direction of said magnetic disk; and
   a magnetic head mounted on said head slider for recording and regenerating data in and from said magnetic disk;
   the magnetic disk having a circumferential length of said control signal recording zone which does not exceed 3/10 times a length of said head slider.

3. In a magnetic disk unit provided with a magnetic disk and magnetic head mounted on a floating head slider for recording and regeneration of data on and from a surface of said magnetic disk, which surface is radially divided into a data recording zone and a control signal recording zone by lands and grooves formed on the surface, the magnetic disk having a ratio of the depth of grooves in said data recording zone and the depth of grooves in said control signal recording zone which is 0.2 or larger and 4.7 or smaller.

4. In a magnetic disk device having:
   a magnetic disk having a surface radially divided into a data recording zone and a control signal recording zone by lands and grooves formed on the surface;
   a head slider floating above the surface of said magnetic disk and caused to move relatively in a radial direction of said magnetic disk; and
   a magnetic head mounted on said head slider for recording and regenerating data in and from said magnetic disk;
   wherein, the magnetic disk device has a ratio of the depth of grooves in said data recording zone and the depth of grooves in said control signal recording zone being 0.2 or larger and 4.7 or smaller.

5. A magnetic disk unit provided with a magnetic disk and a magnetic head mounted on a floating head slider for recording and regeneration of the data in and from a surface of said magnetic disk, which surface is radially divided into a data recording zone and a control signal recording zone by lands and grooves formed on the surface, the magnetic disk having a quotient of a ratio of lands/grooves in said data recording zone divided by a ratio of lands/grooves in said control signal recording zone which is 6.7 or smaller.

6. A magnetic disk device having:
   a magnetic disk having a surface radially divided into a data recording zone and a control signal recording zone by lands and grooves formed on the surface;
   a head slider floating above the surface of said magnetic disk and moving in the radial direction of said magnetic disk; and
   a magnetic head mounted on said head slider for recording and regenerating data in and from said magnetic disk;

the magnetic disk having a quotient of a ratio of lands/grooves in said data recording zone divided by a ratio of lands/grooves in said control signal recording zone which is 6.7 or smaller.

7. A magnetic disk unit provided with a magnetic disk and a magnetic head mounted on a floating head slider for recording and regeneration of data in and from a surface of said magnetic disk, which surface is radially divided into a data recording zone and a control signal recording zone by lands and grooves formed on the surface, the magnetic disk, having a land extending parallel to the moving direction of said head slider provided in said control signal recording zone.

8. The magnetic disk as claimed in claim 7, wherein the ratio of the width of land parallel to the moving direction of said head slider and track width is 0.05 or larger.

9. A magnetic disk device having:
a magnetic disk having a surface radially divided into a data recording zone and a control signal recording zone by lands and grooves formed on the surface;
a head slider floating above the surface of said magnetic disk and caused to move relatively in a radial direction of said magnetic disk; and
a magnetic head mounted on said head slider for recording and regenerating data in and from said magnetic disk;
the magnetic disk device having a land extending parallel to the moving direction of said head slider provided in said control signal recording zone.

10. The magnetic disk device as claimed in claim 9, wherein the ratio of the width of land parallel to the moving direction of said head slider and track width is 0.05 or larger.

11. A magnetic disk unit provided with a magnetic disk and a magnetic head mounted on a floating head slider for recording and regeneration of data in and from a surface of said magnetic disk, which surface is radially divided into a data recording zone and a control signal recording zone by lands and grooves formed on the surface, the magnetic disk, having a train of said control signal recording zones are entirely or partially provided on each projected length of said head slider.

12. The magnetic disk as claimed in claim 11, wherein the number of said control signal recording zones provided in one projected length of said head slider is 1 or more.

13. A magnetic disk device having:
a magnetic disk having a surface radially divided into a data recording zone and a control signal recording zone by lands and grooves formed on the surface;
a head slider floating above the surface of said magnetic disk and caused to move relatively in a radial direction of said magnetic disk; and
a magnetic head mounted on said head slider for recording and regenerating data in and from said magnetic disk;
the magnetic disk device having a train of said control signal recording zones are entirely or partially provided on each projected length of said head slider.

14. The magnetic disk device as claimed in claim 13, wherein the number of said control signal recording zones provided in one projected length of said head slider is 1 or more.

15. A magnetic disk unit provided with a magnetic disk and a magnetic head mounted on a floating head slider for recording and regeneration of data in and from a surface of said magnetic disk, which surface is radially divided into a data recording zone and a control signal recording zone by lands and grooves formed on the surface, the magnetic disk, being structured so that the step difference of said land groove does not exceed 320 nm.

16. A magnetic disk device having:
a magnetic disk having a surface radially divided into a data recording zone and a control signal recording zone by lands and grooves formed on the surface;
a head slider floating above the surface of said magnetic disk and caused to move relatively in a radial direction of said magnetic disk; and
a magnetic head mounted on said head slider for recording and regenerating data in and from said magnetic disk;
the magnetic disk device provided with a magnetic disk which is structured so that the step difference of said land groove does not exceed 320 nm.

17. A magnetic disk unit provided with a magnetic disk and a magnetic head mounted on a floating head slider for recording and regeneration of data, the magnetic disk is provided with:
the land for recording data, and
the groove for rendering dynamic pressure to said head slider for floating just above said groove.

18. A magnetic disk device having:
a magnetic disk for recording and regeneration of data;
a head slider floating above the surface of said magnetic disk and caused to move relatively in a radial direction of said magnetic disk; and
a magnetic head mounted on said head slider for recording and regenerating data in and from said magnetic disk;
the magnetic disk device provided with the land for recording data, and the groove for rendering dynamic pressure to said head slider for floating just above said groove on the surface of said magnetic disk.

19. A magnetic disk unit provided with a magnetic disk and a magnetic head mounted on a floating head slider for recording and regeneration of data in and from a surface of said magnetic disk, which surface is radially divided into a data recording zone and a control signal recording zone by lands and grooves formed on the surface, the magnetic disk in which the load capacity of said head slider on said data recording zone is equal to the load capacity of said head slider on said control signal recording zone.

20. A magnetic disk device having:
a magnetic disk having a surface radially divided into a data recording zone and a control signal recording zone by lands and grooves formed on the surface;
a head slider floating above the surface of said magnetic disk and caused to move relatively in a radial direction of said magnetic disk; and
a magnetic head mounted on said head slider for recording and regenerating data in and from said magnetic disk;
the magnetic disk device in which the load capacity of said head slider on said data recording zone is equal to the load capacity of said head slider on said control signal recording zone.

* * * * *

UNITED STATES PATENT AND TRADEMARK OFFICE
CERTIFICATE OF CORRECTION

PATENT NO.    : 5,828,536
DATED         : October 27, 1998
INVENTOR(S)   : Osamu Morita It is certified that error appears in the above-identified patent and that said Letters Patent is hereby corrected as shown below:

Column 3,
Line 58, change "FIG. 6 is a plan view" to -- FIGS. 6A and 6B are plan views --.

Figure 23A:
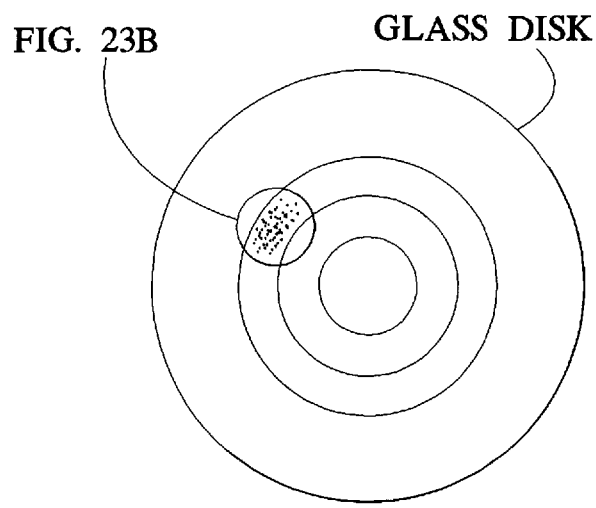
FIG. 23 is a diagram for illustrating the floatation of the head slider above a flat surface and the land groove surface and the relative speed between the glass disk and head slider.
Figure 23B:
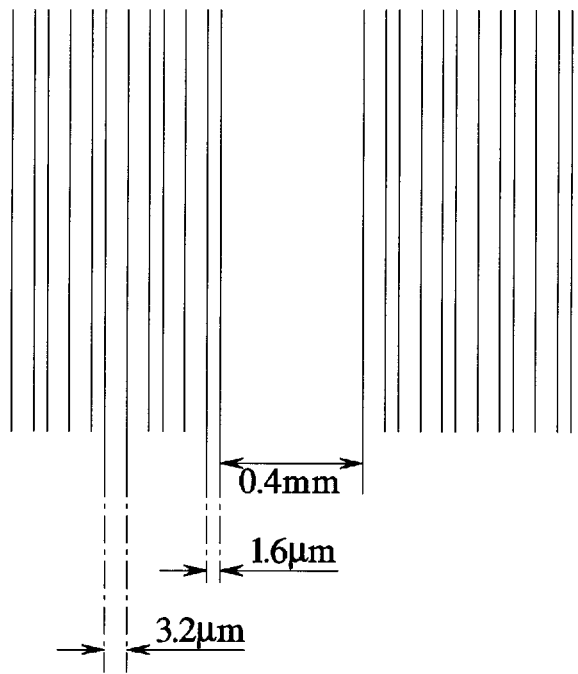

Column 4,
Line 50, change "FIG. 23A is a diagram" to -- FIGS. 23A and 23B are diagrams --.

Column 6,
Line 12, change "FIG. 6 is a plan view" to -- FIGS. 6A and 6B are plan views --.

Column 20,
Line 14, change "FIG. 23" to -- FIGS. 23A and 23B --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*